(12) United States Patent
Cho et al.

(10) Patent No.: US 10,727,946 B2
(45) Date of Patent: Jul. 28, 2020

(54) CELLULAR COMMUNICATION SYSTEM HAVING A SET OF SMALL CELLS AS A SIGNAL SOURCE

(71) Applicant: SOLiD Inc., Seongnam-si (KR)

(72) Inventors: Young Man Cho, Seoul (KR); Hee Hwan Kwak, Seongnam-si (KR)

(73) Assignee: SOLiD Inc., Seongnam-si (KR)

( * ) Notice: Subject to any disclaimer, the term of this patent is extended or adjusted under 35 U.S.C. 154(b) by 225 days.

(21) Appl. No.: 15/692,341

(22) Filed: Aug. 31, 2017

(65) Prior Publication Data

US 2018/0076898 A1 Mar. 15, 2018

(30) Foreign Application Priority Data

Sep. 9, 2016 (KR) ........................ 10-2016-0116814

(51) Int. Cl.
*H04B 10/2575* (2013.01)
*H04W 52/02* (2009.01)
*H04W 80/02* (2009.01)
*H04W 88/08* (2009.01)
(Continued)

(52) U.S. Cl.
CPC . *H04B 10/25753* (2013.01); *H04B 10/25759* (2013.01); *H04W 52/0203* (2013.01);
(Continued)

(58) Field of Classification Search
CPC ........ H04B 10/25753; H04B 10/25759; H04B 2210/006; H04W 52/0203; H04W 88/085;
(Continued)

(56) References Cited

U.S. PATENT DOCUMENTS 9,042,732 B2 5/2015 Cune et al.
2005/0185576 A1* 8/2005 Sugawara .............. H04J 3/1611
370/216
(Continued)

FOREIGN PATENT DOCUMENTS

KR 10-2014-0073377 A 6/2014
KR 10-2016-0030523 A 3/2016
WO WO 2015/063758 A1 5/2015

OTHER PUBLICATIONS

Extended European Search Report dated Jul. 12, 2018, in corresponding European Application No. 18153383.7 (5 pages, in English).

*Primary Examiner* — Hoang-Chuong Q Vu
(74) *Attorney, Agent, or Firm* — NSIP Law

(57) ABSTRACT

An analog distributed antenna system having a set of small cells as a signal source is provided. A proposed cellular communication system includes an upper small cell unit including upper protocol processors configured to process an upper first part of a protocol stack of a small cell, a lower small cell unit including lower protocol processors configured to process a remaining second part of the protocol stack of the small cell, and a first matching switch configured to respectively match the lower protocol processors to a plurality of remote units. According to one aspect, the cellular communication system includes a common controller configured to control activation of the plurality of upper protocol processors of the upper small cell unit and the plurality of lower protocol processors of the lower small cell unit according to a required service capacity and appropriately control an operation of the first matching switch.

22 Claims, 18 Drawing Sheets

(52) U.S. Cl.
CPC ....... *H04B 2210/006* (2013.01); *H04W 80/02* (2013.01); *H04W 88/085* (2013.01); *Y02D 70/00* (2018.01); *Y02D 70/1262* (2018.01); *Y02D 70/1264* (2018.01); *Y02D 70/46* (2018.01)

(58) Field of Classification Search
CPC ... H04W 80/02; Y02D 70/00; Y02D 70/1264; Y02D 70/46; Y02D 70/1262
See application file for complete search history.

(56) References Cited

U.S. PATENT DOCUMENTS

| | | | | |
|---|---|---|---|---|
| 2006/0013184 | A1* | 1/2006 | Utsunomiya | H04W 76/23 370/343 |
| 2006/0023718 | A1* | 2/2006 | Joly | H04L 45/245 370/392 |
| 2007/0058680 | A1* | 3/2007 | Choi | H04H 20/79 370/480 |
| 2009/0029645 | A1* | 1/2009 | Leroudier | H04B 7/2606 455/7 |
| 2010/0128732 | A1* | 5/2010 | Jiang | H04L 12/42 370/400 |
| 2013/0044766 | A1* | 2/2013 | Pantelias | H04L 12/2801 370/468 |
| 2014/0362763 | A1* | 12/2014 | Hu | H04W 88/085 370/315 |
| 2015/0365501 | A1* | 12/2015 | Uyehara | H04L 69/08 455/561 |
| 2016/0119221 | A1* | 4/2016 | Tochio | H04L 45/02 398/52 |
| 2016/0135175 | A1* | 5/2016 | Tarlazzi | H04W 28/08 370/329 |
| 2016/0352419 | A1* | 12/2016 | Fonseka | H04B 10/0793 |
| 2018/0176799 | A1* | 6/2018 | Lange | H04W 16/32 |

* cited by examiner

CELLULAR COMMUNICATION SYSTEM HAVING A SET OF SMALL CELLS AS A SIGNAL SOURCE

CROSS-REFERENCE TO RELATED APPLICATION(S)

This application claims the benefit under 35 USC § 119(a) of Korean Patent Application No. 10-2016-0116814, filed on Sep. 9, 2016, in the Korean Intellectual Property Office, the entire disclosure of which is incorporated herein by reference for all purposes.

BACKGROUND

1. Field

The following description relates to a cellular communication technology, and more particularly, to a distributed antenna system (DAS) having a set of small cells as a source.

2. Description of Related Art

In mobile communications, wireless coverage is dependent, to large extent, on a base transceiver station (BTS). Due to high costs of installing BTSs, there has been an attempt to expand wireless coverage through a remote radio head (RRH) device. The RRH device is connected with a BTS via a fiber optic cable using common public radio interface (CPRI) protocols.

Further, a distributed antenna system (DAS) may be introduced in order to enhance in-building coverage. U.S. Pat. No. 9,042,732 discloses an example of the DAS.

A typical analog DAS includes a headend unit and remote units. The headend unit is connected to BTSs or RRH devices via coaxial cables, converts radio frequency (RF) signal inputs from the connected BTSs or RRH devices into optical RF signals, and outputs the optical RF signals, and the remote units are connected to the headend unit via optical fibers and distribute downlink optical RF signals to wireless terminals.

Such an analog DAS is difficult to reconfigure once it has been deployed, and cannot scale dynamically to a required service capacity.

Meanwhile, as mobile communication technology evolves into long term evolution (LTE)-Advanced, a small cell technology emerges as one approach to maximize usage efficiency within limited resources. Small cells are low-powered wireless access BTSs, which are each defined as having an operational range from at least 10 meters to a few hundred meters. Small cells are classified as femtocells, picocells, metrocells, and microcells according to their usage range and purpose of use. In addition, the classification of small cells may be made according to an installation site and purpose of service, and small cells for home, enterprise, urban areas, and rural areas may exist.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a cellular communication system which uses an analog distributed antenna system (DAS) that is readily reconfigurable according to a required service capacity.

The following description relates to a cellular communication system which uses an analog DAS whose capacity is scalable according to a required service capacity.

The following description relates to a cellular communication system which uses an analog DAS that is readily reconfigurable according to a required service capacity while minimizing addition of hardware devices or components at the customer sites.

Further, the following description relates to a cellular communication system which uses an analog DAS that is remotely reconfigurable according to a required service capacity.

The proposed cellular communication system includes an analog DAS that has a set of small cells as a signal source. According to one aspect, the set of small cells has a variable architecture which may increase the number of users or capacity in association with the analog DAS.

The afore-mentioned aspect is achieved by a small cell signal source including: an upper small cell unit including upper protocol processors configured to process an upper first part of a protocol stack of a small cell; a lower small cell unit including lower protocol processors configured to process a remaining second part of the protocol stack of the small cell; and a first matching switch configured to respectively match the lower protocol processors to a plurality of remote units. According to one aspect, the cellular communication system includes a common controller configured to control activation of the plurality of upper protocol processors of the upper small cell unit and the plurality of lower protocol processors of the lower small cell unit according to a required service capacity and to control an operation of the first matching switch.

According to additional aspect, the upper protocol processor may process a media access control (MAC) layer or higher in the protocol stack of the small cell and the lower protocol processor may process a physical (PHY) layer of the protocol stack of the small cell.

According to another aspect, the plurality of upper protocol processors of the upper small cell unit may be implemented as software tasks whose executions are controlled by the common controller. Similarly, the plurality of lower protocol processors of the lower small cell unit may be implemented as software tasks whose executions are controlled by the common controller.

According to still another aspect, the common controller may be implemented by a part included in the upper small cell unit.

According to yet another aspect, the common controller may additionally activate the upper protocol processor when an increase in the number of users is required.

According to another aspect, the common controller may additionally activate the lower protocol processor when an increase in bandwidth is required, and accordingly, the common controller may control the operation of the first matching switch.

According to another aspect, the cellular communication system may further include a plurality of wireless converters installed between the lower protocol processors and input ports of the first matching switch, respectively, and configured to convert an output of the lower protocol processor into a radio frequency (RF) signal. According to an optional aspect, the common controller may control the plurality of wireless converters having the same service process so that different frequencies are modulated.

According to yet another aspect, the cellular communication system may further include a plurality of wireless converters respectively connected to output port of the first matching switch and configured to convert an output of each of the lower protocol processor into an RF signal. According to an optional aspect, the common controller may control the plurality of wireless converters having the same service process so that different frequencies are modulated.

In one general aspect, the first matching switch may be connected between outputs of the plurality of lower protocol processors and a plurality of inputs of a headend unit of an analog distributed antenna system. According to an optional aspect, when additional service capacity is required, the common controller may additionally activate the upper protocol processor and a lower protocol processor corresponding to the upper protocol processor, wherein the lower protocol processor transceiving an RF signal is activated in a band that is different from a current band, and the common controller controls the additionally activated lower protocol processor to be connected to the base-station signal driving unit. According to another optional aspect, when additional service capacity is required, the common controller may additionally activate the upper protocol processor and the lower protocol processor, control a base-station signal driving unit connected to the additionally activated lower protocol processor to perform band up/down-conversion, and control a remote unit corresponding to the base-station signal driving unit to perform reverse band conversion.

In another general aspect, the first matching switch may be connected between outputs of the plurality of upper protocol processors and inputs of the plurality of lower protocol processors. According to an optional aspect, when an additional service capacity is required, the common controller may additionally activate the lower protocol processor transceiving an RF signal in a band that is different from a current band. According to another optional aspect, when additional service capacity is required, the common controller may additionally activate the lower protocol processor, control a base-station signal driving unit connected to the additionally activated lower protocol processor to perform band up/down-conversion, and control a remote unit corresponding to the base-station signal driving unit to perform reverse band conversion.

Other features and aspects will be apparent from the following detailed description, the drawings, and the claims.

Figure 1:
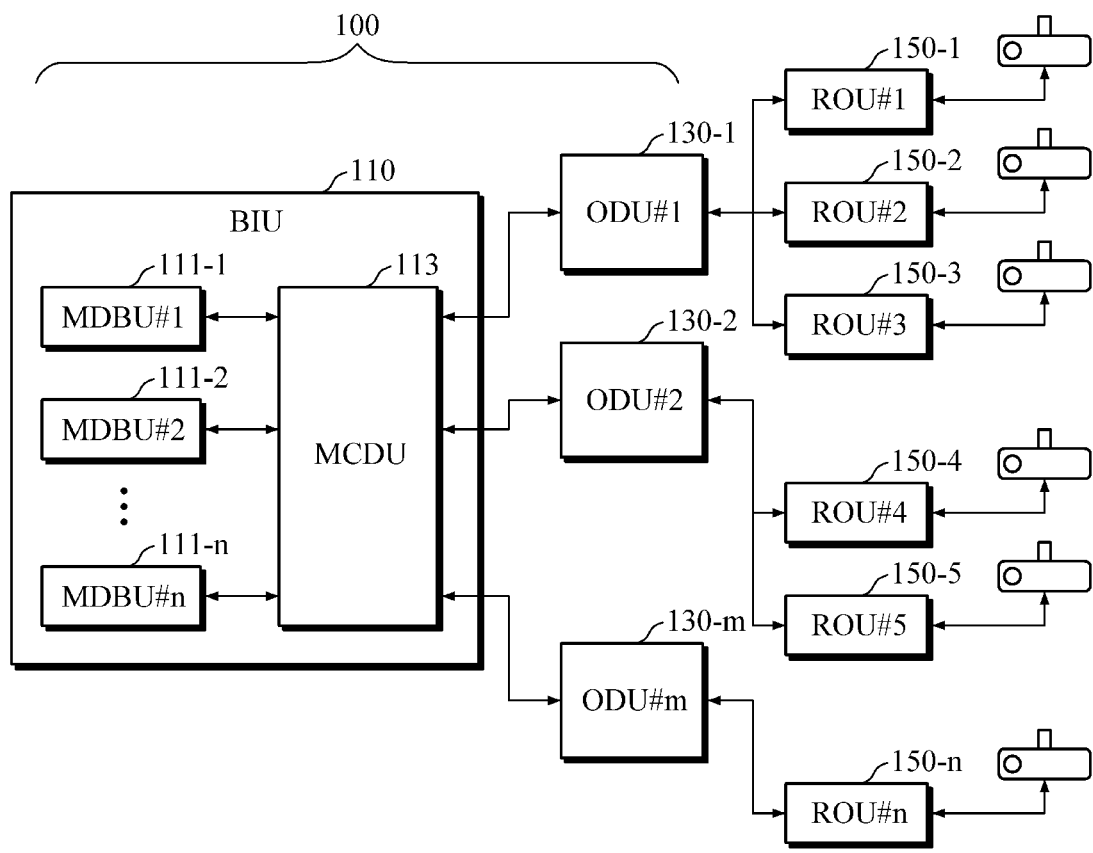
FIG. 1 is a diagram illustrating an example of an analog distributed antenna system (DAS).

Throughout the drawings and the detailed description, the same drawing reference numerals should be understood as referring to the same elements, features, and structures unless otherwise described. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Also, although configurations of selectively described aspects or selectively described embodiments in below are illustrated as a single integrated configuration in the drawings, it should be understood that these configurations may be freely combined with each other as long as a technological contradiction of such a combination is not apparent for those skilled in the art unless otherwise described. It should also be noted that each block of the block diagrams may represent a physical element, and in some cases, may represent part of a function of one physical element or a logical representation of a function over a number of physical elements. A block or a portion of a block may sometimes be a set of program instructions. All or some of the blocks may be implemented by hardware, software, or a combination thereof.

FIG. 1 is a diagram illustrating an example of an analog distributed antenna system (DAS) to which the present invention is applicable. As shown in FIG. 1, the analog DAS includes a headend unit 100 and a plurality of remote units 150. In the illustrated example, the remote units are represented as remote optical units 150. The headend unit 100 and the plurality of remote optical units 150 are connected via optical cables. The term "remote unit" indicates that the headend unit may be connected to the plurality of remote optical units 150 via coaxial cables or other analog cables instead of the optical cables. The headend unit 100 mixes and converts a plurality of radio frequency (RF) signals from a plurality of base transceiver stations (BTSs) into an optical RF signal. Each of the remote optical units 150 is disposed at each site, converts the optical RF signal received from the headend unit into an electrical RF signal, and transmits the electrical RF signal to the antenna. A description regarding a downlink signal may be applied to an uplink signal in a symmetrical manner.

For example, the headend unit 100 includes a base station interface unit (BIU) 110 and an optical distribution unit (ODU) 130. The BIU 110 includes a plurality of base-station signal driving units 111, which receive a signal of each band from a BTS, up/down convert the band of the signal if necessary, and output the resultant signal, and a combine-divider 113, which mixes RF signals input from the plurality of base-station signal driving units and output a resultant signal. In the drawing, according to the names used in an applicant's commercialized system, the base-station signal driving unit is denoted as a main driver BTS unit (MDBU) and the combine-divider 113 is denoted as a main combiner/divider unit (MCDU). In the present exemplary embodiment, the base-station signal driving units 111 are connected to an output of BTS equipment of each mobile communication service operator via coaxial cables. However, the present invention is not limited to the above, and the base-station signal driving units 111 may also be connected via optical cables. The base-station driving units 111 may deal with different frequency bands or different signal specifications according to specifications of a mobile communication service operator or specifications of BTS equipment. The combine-divider 113 has a plurality of outputs, through each of which a mixture of the RF signals output from the base-station signal driving units 111 is output according to needs of the remote optical units 150.

The ODU 130 converts the RF signal output from the combine-divider 113 into an optical RF signal, and distributes and outputs the optical RF signal through a plurality of output ports.

The remote optical unit 150 receives the optical RF signals from the ODU 130. Each output port of the ODU 130 may be connected with the remote optical unit 150. For example, in FIG. 1, an ODU 130-1 is connected with remote optical units 150-1, 150-2, and 150-3. Also, an ODU 130-2 is connected with remote optical units 150-4 and 150-5.

Figure 2:
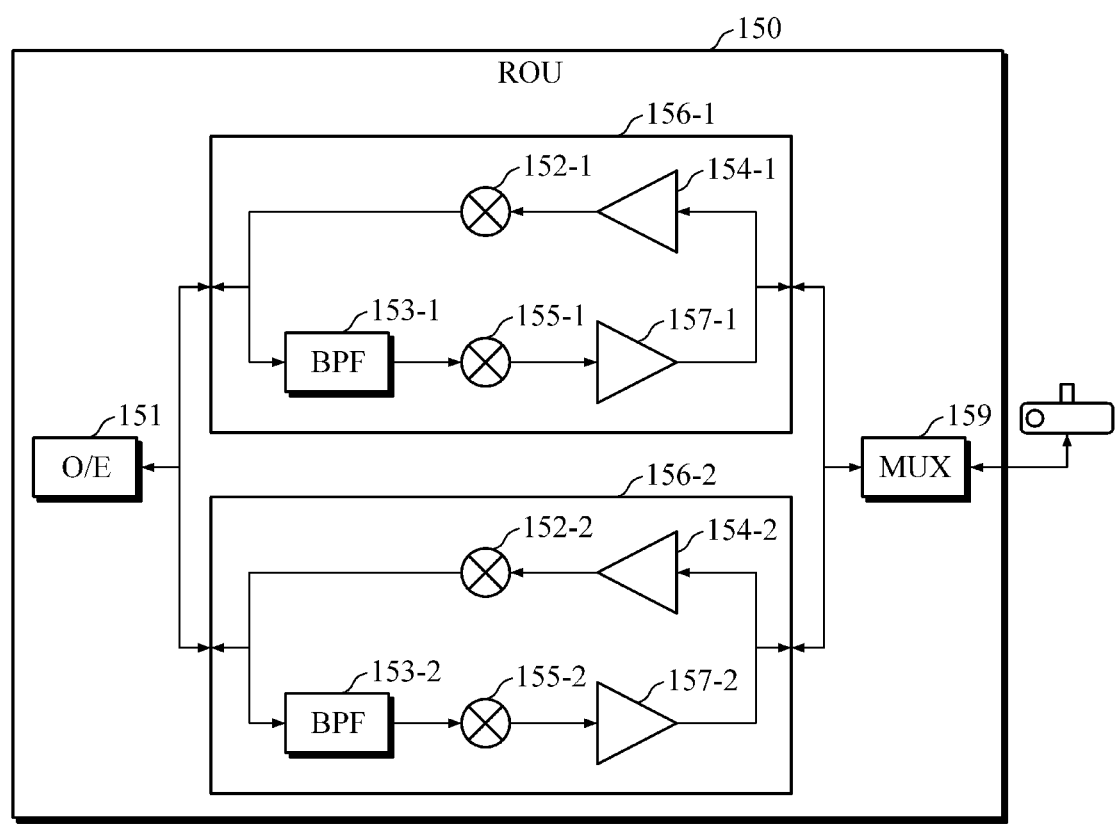
FIG. 2 is a block diagram illustrating an example of a configuration of a remote optical unit of FIG. 1.

FIG. 2 is a block diagram illustrating an example of a configuration of a remote optical unit of FIG. 1. In one exemplary embodiment, the remote optical unit 150 includes three types of modules which are a photoelectric conversion unit 151 configured to convert the optical RF signals received from the ODU 130 into electrical RF signals, a plurality of remote drive units (RDUs) 156-1 and 156-2, and a combine unit configured to combine signals generated from the RDUs. In one exemplary embodiment, the remote optical units 150 may include the plurality of RDUs.

Each of the RDUs 156-1 and 156-2 includes a bandpass filter 153 which filters only a required band in an RF signal on a downlink path, a modulation/demodulation unit 155 which up/down converts a band of the filtered RF signal when necessary and outputs a resultant signal, and a power amplifier 157. Each of the RDUs 156-1 and 156-2 includes a low noise amplifier 154 which amplifies a signal from an antenna on an uplink path and a modulation/demodulation unit 152 which up/down converts a band of output from the low noise amplifier 154 and outputs a resultant signal when necessary. A plurality of RF signals of different bands may be multiplexed and transmitted through a single optical fiber.

Figure 3:
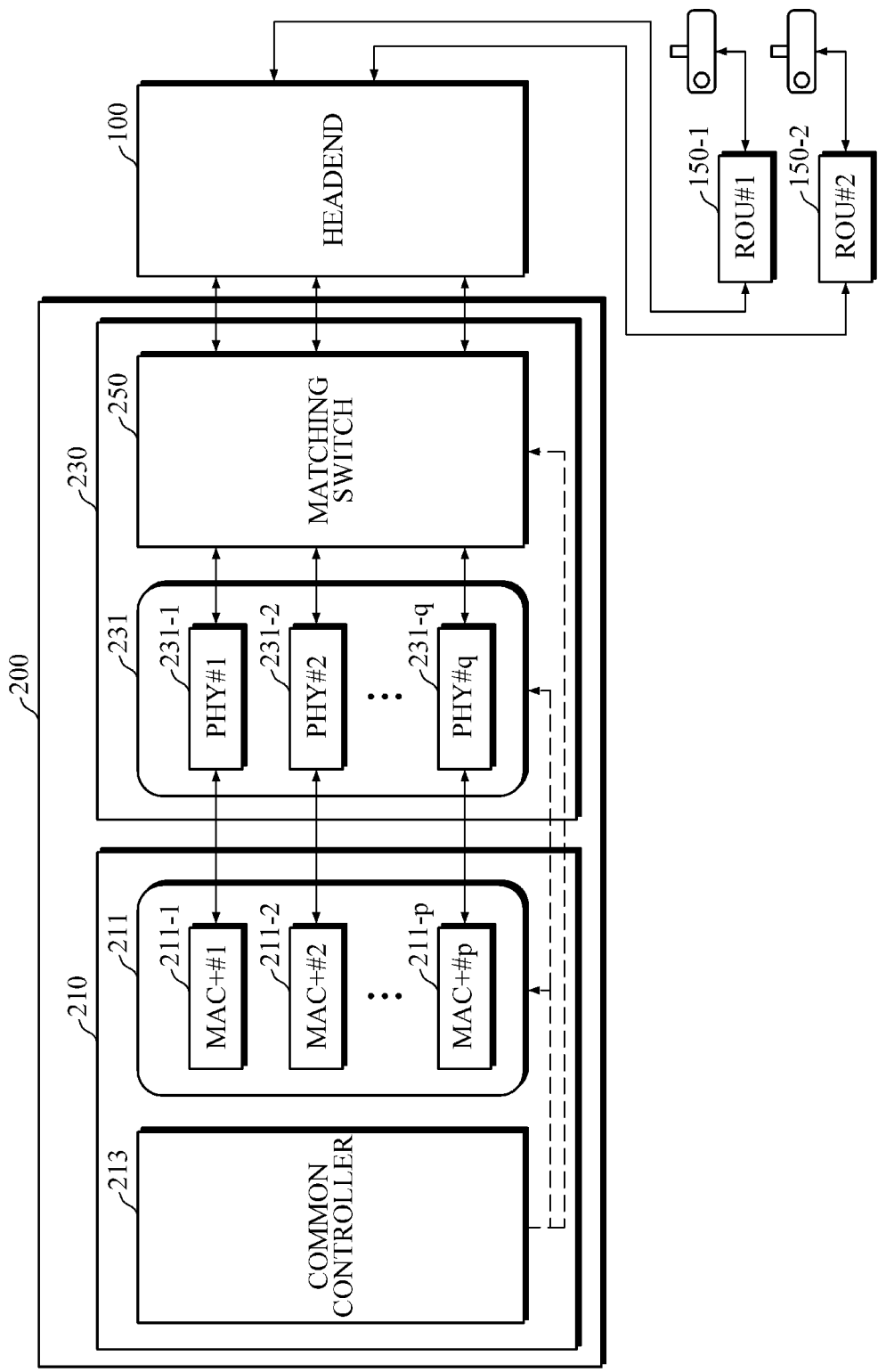
FIG. 3 is a block diagram illustrating a configuration of a cellular communication system according to one exemplary embodiment.

FIG. 3 is a block diagram illustrating a configuration of a cellular communication system according to one exemplary embodiment. As illustrated in FIG. 3, the cellular communication system includes equipment for a small cell signal source 200, a headend unit 100, and remote units 150-1 and 150-2. The small cell signal source 200 includes an upper small cell unit 210 and a lower small cell unit 230. The upper small cell unit 210 includes a plurality of upper protocol processors 211. Each upper protocol processor 211 processes a first part of a protocol stack of a small cell from an uppermost protocol of the protocol stack of the small cell.

The lower small cell unit 230 includes a plurality of lower protocol processors 231. Each lower protocol processor 231 processes a remaining second part of the protocol stack of the small cell.

According to one aspect, the first part processed by the upper protocol processor 211 may be a media access control (MAC) layer and/or higher in the protocol stack of the small cell. In this case, the remaining second part processed by the lower protocol processor may be a physical (PHY) layer in the protocol stack of the small cell. Such function splitting is possible on various levels.

In regard to long term evolution (LTE) radio interface protocols, a number of technical materials have been available, for example, there is the article entitled "Overview of LTE Radio Interface and Radio Network Architecture for High Speed, High Capacity and Low Latency" which was published on pages 10-19 in NTT TOCOMO Technical Journal Vol. 13 No. 1. As described in the article, the LTE radio interface protocols may be classified as radio resource control (RRC), packet data convergence protocol (PDCP), radio link control (RLC), MAC, and PHY layer protocols. Among PDCP, RLC, and MAC layers that correspond to a second layer in seven layers of open system interconnection (OSI), the PDCP layer receives an RRC packet and processes header compression, a cipher of an RRC message, and integrity protection. The RLC layer segments and concatenates protocol data unit (PDU) packets from the PDCP layer to generate an RLC PDU with an appropriate packet size. In particular, the RLC layer performs automatic repeat request (ARQ) control according to a response from a receiving side. The MAC layer performs scheduling of shared channel resources. Also, the MAC layer processes a hybrid ARQ (HARQ). The PHY layer performs cell search and channel-dependent scheduling in a frequency domain, and performs a random access procedure when making a call.

Although the illustrated embodiment is described as an example of an LTE system, the present invention is not limited thereto and can be applied to general mobile communication technologies or a combination thereof, as is typical for a DAS.

Virtualization technique of a radio access network (RAN), which has been recently discussed in the Small Cell Forum (http://www.smallcellforum.org), may be considered as a reference technique, although it is not directly related to the present invention. According to this technique, some upper layers among RAN layers for mobile communication are virtualized and implemented in cloud space in a software manner, and the remaining layers are implemented as physical network functions. In this forum, the discussion on "function splitting" is in progress regarding which layers are to be virtualized and which layers are to be implemented as physical network functions among the RAN layers. According to the ongoing discussion, because splitting is performed on higher layers, transport costs are advantageously reduced, while RF gains are also reduced. Important factors for considering function splitting in RAN virtualization which can secure smooth communications between virtualized functional blocks and physical lower layer functional blocks include bandwidth and latency. According to the materials disclosed by the Small Cell Forum, function splitting between a MAC layer and a PHY layer may provide a trade-off in terms of bandwidth and latency.

Referring back to FIG. 3, the small cell signal source 200 of the cellular communication system in accordance with the exemplary embodiment includes a first matching switch 250 and a common controller 213. The first matching switch 250 respectively matches lower protocol processors to the plurality of remote units 150 connected to the BIU by switching on or off an output path of each of the lower protocol processors. According to a required service capacity, the common controller 213 activates a plurality of upper protocol processors of the upper small cell unit and a plurality of lower protocol processors of the lower small cell unit, and accordingly, controls an operation of the first matching switch 250.

In one exemplary embodiment, the upper protocol processors 211 may be implemented in a software manner, as well as in a circuitry manner. For example, each of the upper protocol processors 211 may be programmed in a general programming language (e.g., C/C++ language, etc.), then be compiled and executed as a task or a process on a central processing unit (CPU). In one exemplary embodiment, the lower protocol processors 231 may be implemented in a circuit manner. For example, each of the lower protocol processors 231 may be implemented in the form of a gate array or firmware.

According to one aspect, a plurality of upper protocol processors 211-1 to 211-$p$ of the upper small cell unit 210 may be implemented as software tasks whose execution is controlled by the common controller 213. Similarly, a plurality of lower protocol processors 231-1 to 231-$q$ of the lower small cell unit 230 may be implemented as software tasks whose execution is controlled by the common controller 213. As is already known, since the upper protocol processors 211-1 to 211-$p$ are implemented as software tasks, they do not physically or logically reside within the upper small cell unit 210, and no corresponding program modules exist on a program code. Rather, the upper protocol processors may be considered as entities which are newly generated and executed on memory under the control of a scheduler. Although, due to the technical difficulty in representation, it is stated that the small cell unit includes a plurality of upper protocol processors, such statement or similar expressions are intended to be construed to imply a case in which the plurality of upper protocol processors are implemented as software tasks, as well as a case in which the upper protocol processors are implemented physically, that is, as circuitry, in the upper small cell unit.

In another exemplary embodiment, some of logical modules of the upper protocol processor 211 may be implemented in a circuit manner. For example, a part of each of the upper protocol processors 211 may be implemented in the form of a gate array or firmware, and the remaining part may be implemented as a software task. Similarly, in one exemplary embodiment, some of logical modules of the lower protocol processor 231 may be implemented in a circuit manner. For example, a part of each of the lower protocol processor 231 may be implemented in the form of a gate array or firmware, and the remaining part may be implemented as a software task.

In another exemplary embodiment, the upper protocol processor 211 may be implemented as a software task, and the lower protocol processors 231-1 to 231-$q$ may be implemented in a circuit manner.

In this case, the common controller 213 schedules execution of shared resources of the upper small cell unit 210. According to another aspect, the common controller 213 may be implemented as one of components included in the upper small cell unit. In the illustrated exemplary embodiment, the small cell is an LTE small cell, and, for example, the common controller may be implemented as a function of a scheduler that processes scheduling of shared channel resources in the MAC layer. Additionally, the common controller 213 operates to mitigate interference which may occur when a plurality of PHY layers transmit different RF signals using the same frequency in a multi-cell or multi-sector environment.

The first matching switch 250 may be a physical switch that switches on or off output, or may be implemented as a software input/output interface for using an output of a program module as input or a program code, such as an input/output command. In the illustrated exemplary embodiment, the first matching switch 250 is included in the lower small cell unit 230, but it is not limited thereto and may be configured as a separate device.

In the illustrated exemplary embodiment, the first matching switch 250 connects an output of each of the lower protocol processors 231 to a plurality of headend units 100 by switching on or off an output path of each of the lower protocol processors 231.

According to one aspect, when the number of users increases in a region where a DAS provides services, that is, in a service region, the common controller 213 additionally activates the upper protocol processor 211 of the upper small cell unit.

According to another aspect, when additional bandwidth or capacity is required due to an increase in the use of the frequency band by users in a region where the DAS provides services, i.e., in a service region, the common controller 213 additionally activates the lower protocol processor 231 of the lower small cell unit 230. The common controller 213 controls the first matching switch 250 to connect the activated lower protocol processor 231 to the remote unit that needs additional capacity.

Figure 4:
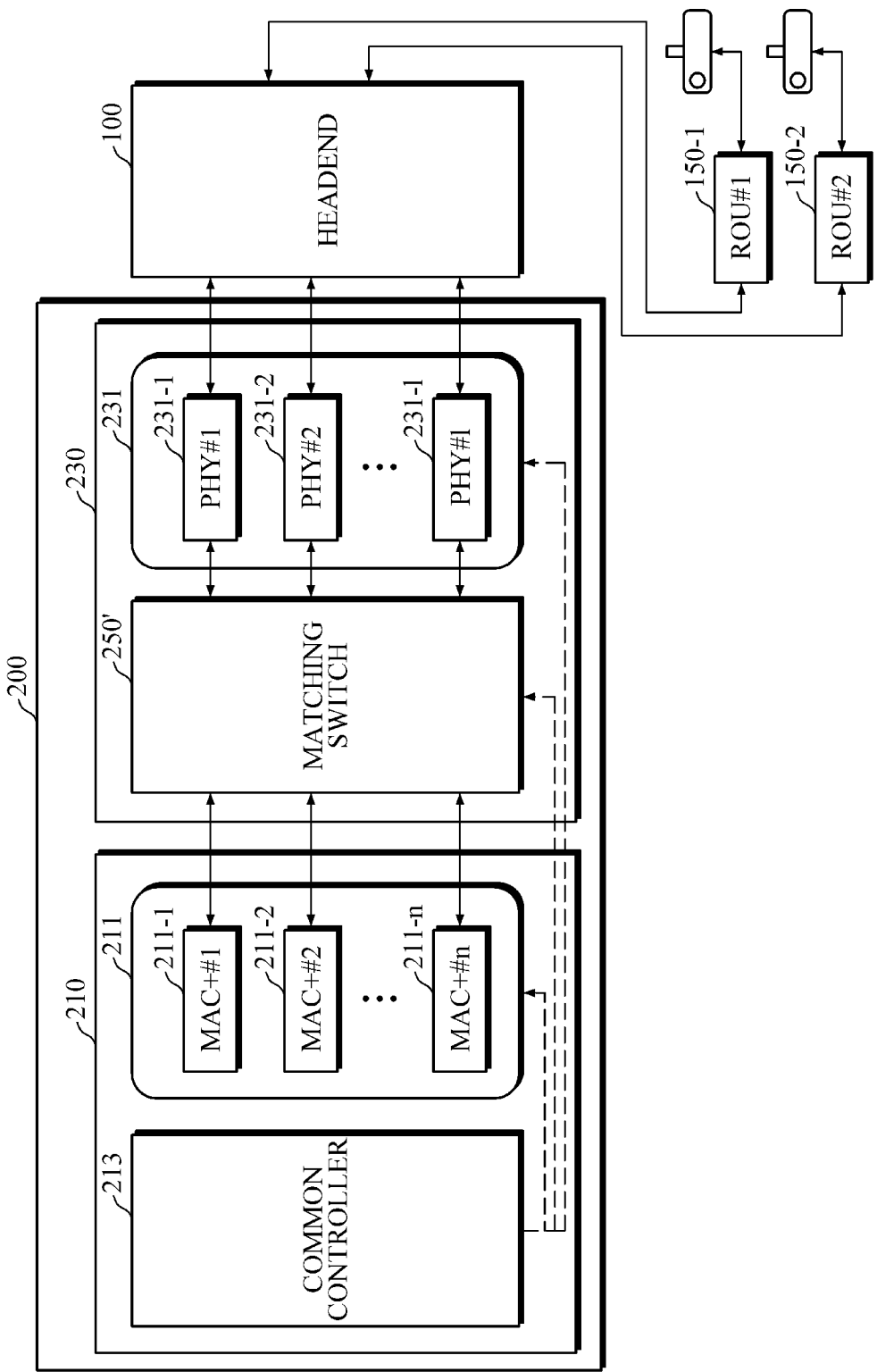
FIG. 4 is a block diagram illustrating a configuration of a cellular communication system according to another exemplary embodiment.

FIG. 4 is a block diagram illustrating a configuration of a cellular communication system according to another exemplary embodiment. As illustrated in FIG. 4, the cellular communication system includes a small cell signal source 200, a headend unit 100, and a plurality of remote units 150-1 and 150-2. The small cell signal source 200 includes an upper small cell unit 210, a lower small cell unit 230, and a second matching switch 250'. The upper small cell unit 210 includes a plurality of upper protocol processors 211-1 to 211-$n$ that process an upper first part of a protocol stack of a small cell. The lower small cell unit 230 includes a plurality of lower protocol processors 231-1, 231-2, and 231-I that process a remaining second part of the protocol stack of the small cell.

The second matching switch 250' switches on or off connections between each lower protocol processor of the lower small cell unit and each upper protocol processor of the upper small cell unit. The second matching switch 250' may be a physical switch that switches on or off output, or may be implemented as a software input/output interface for using an output of a program module as input, or a program code such as an input/output command. Since configurations corresponding to those of FIG. 4 are similar to those in FIG. 3, detailed descriptions thereof are omitted.

According to one aspect, when the number of users increases in a region where a DAS system provides services, i.e., in a service region, the common controller 213 additionally activates the upper protocol processor 211 of the upper small cell unit and the lower protocol processor 231 of the lower small cell unit, and in turn, controls an operation of the second matching switch 250'. According to another aspect, when additional bandwidth or capacity is required due to an increase in the use of the frequency band by users in a region where a DAS system provides services, i.e., in a service region, the common controller 213 additionally activates the lower protocol processor 231 of the lower small cell unit 230

Figure 5:
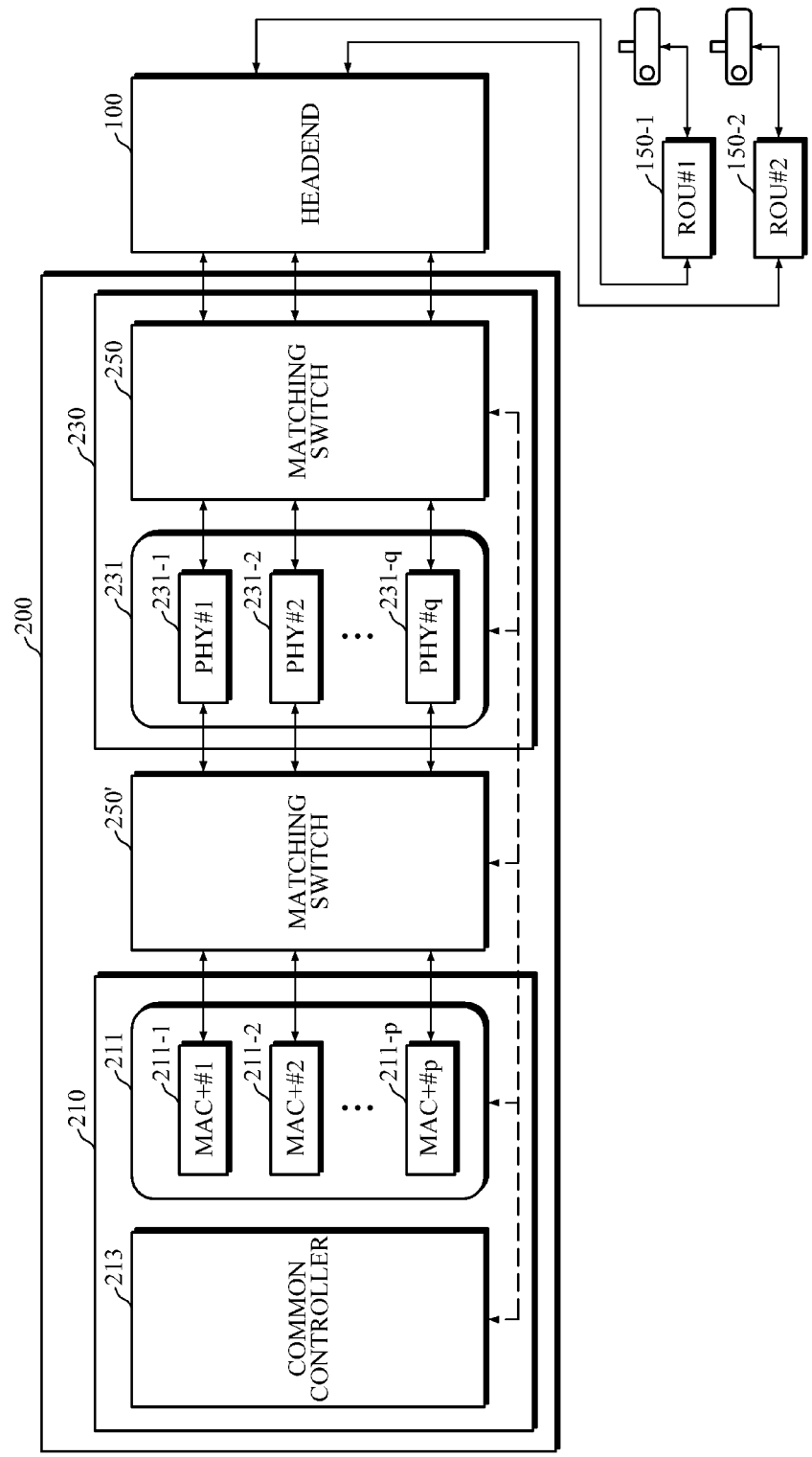
FIG. 5 is a block diagram illustrating a configuration of a cellular communication system according to still another exemplary embodiment.

FIG. 5 is a block diagram illustrating a configuration of a cellular communication system according to still another exemplary embodiment. As illustrated in FIG. 5, the cellular communication system includes a small cell signal source 200, a headend unit 100, and a plurality of remote units 150-1 and 150-2. The small cell signal source 200 includes an upper small cell unit 210, a lower small cell unit 230, a first matching switch 250, and a second matching switch 250'. The upper small cell unit 210 includes a plurality of upper protocol processors 211-1 to 211-*n* that process an upper first part of a protocol stack of a small cell. The lower small cell unit 230 includes a plurality of lower protocol processors 231-1, 231-2, and 231-I that process a remaining second part of the protocol stack of the small cell.

The first matching switch 250 switches on or off an output path of each lower protocol processor. The second matching switch 250' switches on or off a connection between each lower protocol processor of the lower small cell unit and each upper protocol processor of the upper small cell unit. Each of the first matching switch 250 and the second matching switch 250' may be a physical switch which switches on or off output, or may be implemented as a software input/output interface for using an output of a program module as input, or a program code such as an input/output command. Since configurations corresponding to those of FIG. 5 are similar to those in FIG. 3, detailed descriptions thereof will be omitted.

According to one aspect, when the number of users increases in a region where a DAS system provides services, that is, in a service region, the common controller 213 additionally activates the upper protocol processor 211 of the upper small cell unit and the lower protocol processor 231 of the lower small cell unit, and in turn, controls an operation of the second matching switch 250'.

According to another aspect, when additional bandwidth or capacity is required due to an increase in the use of the frequency band by users in a region where a DAS system provides services, i.e., in a service region, the common controller 213 additionally activates the lower protocol processor 231 of the lower small cell unit 230, and in turn, controls an operation of the first matching switch 250. Thus, a plurality of lower protocol processors 231 may be connected to a single upper protocol processor 211.

As should be apparent from the exemplary embodiments illustrated, one or both of the first matching switch 250 and the second matching switch 250' may be provided.

Figure 6:
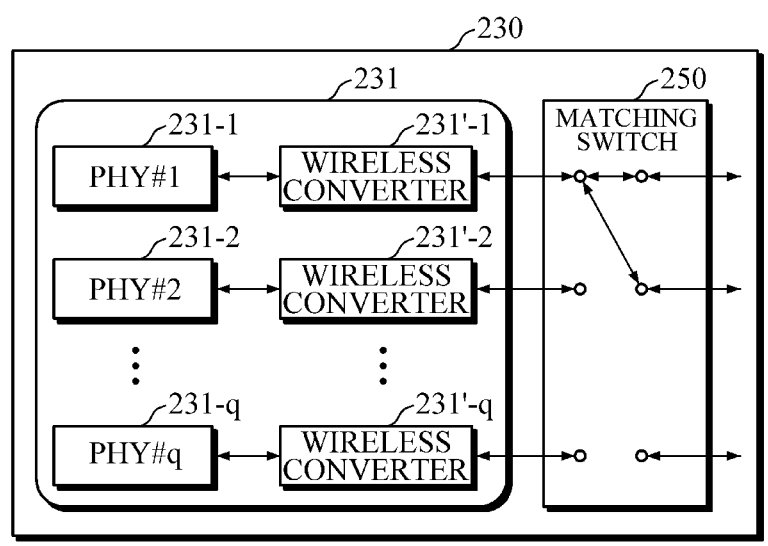
FIGS. 6 to 8 are block diagrams illustrating embodiments of a configuration of a lower small cell unit in the exemplary embodiment shown in FIG. 3 or 5.

FIG. 6 is a block diagram illustrating one embodiment of a configuration of the lower small cell unit 230 in the exemplary embodiment shown in FIG. 3 or 5. According to one aspect, in the lower small cell unit 230, the lower protocol processor 231 includes wireless converters 231'-1 to 231'-*q*. In the present embodiment, an output from the small cell is an RF signal, and the first matching switch 250 switches the RF signal from the lower protocol processor 231.

Figure 7:
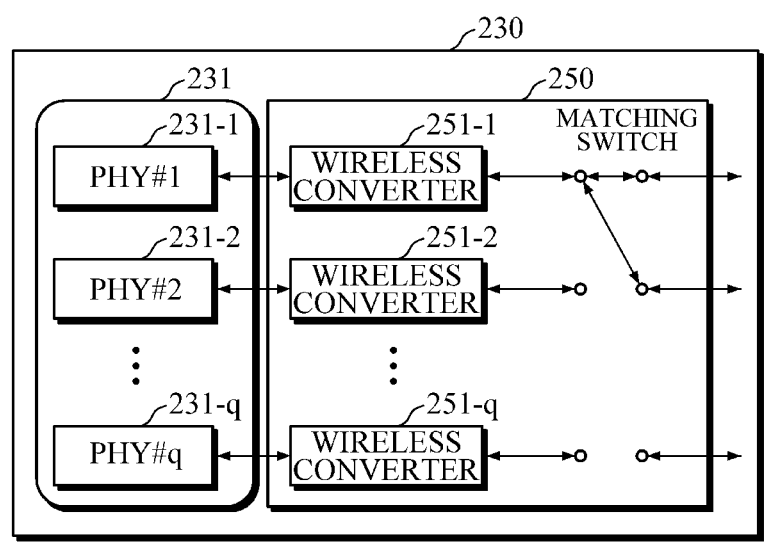

FIG. 7 is a block diagram illustrating another embodiment of a configuration of the lower small cell unit 230 in the exemplary embodiment shown in FIG. 3 or 5. As shown in FIG. 7, the first matching switch includes wireless converters 251-1 to 251-*q* at a receiving side. The small cell outputs a digital signal, for example, an LTE IQ signal, and the first matching switch 250 converts the IQ signal into an RF signal by modulating the IQ signal in the receiving side, and then transmits the RF signal to the remote optical unit which matches the small cell.

Figure 8:
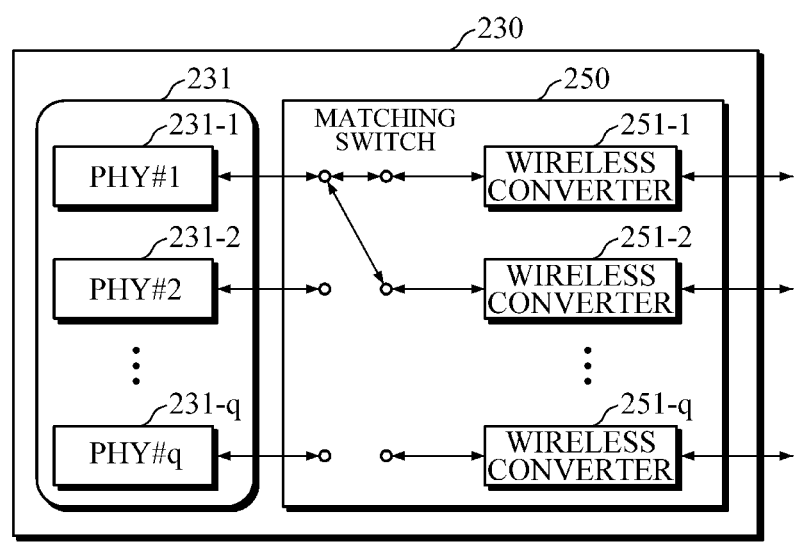

FIG. 8 is a block diagram illustrating still another embodiment of a configuration of the lower small cell unit 230 in the exemplary embodiment shown in FIG. 3 or 5. As shown in FIG. 8, the first matching switch 250 includes the wireless converters 251-1 to 251-*q* at an output side. The small cell outputs a digital signal, for example, an LTE IQ signal, and the first matching switch 250 respectively connects the small cells to the remote optical units so that outputs of the small cells respectively match the remote optical units, and then the first matching switch 250 converts the IQ signal into an RF signal by modulating the IQ signal, and outputs the RF signal.

Figure 9:
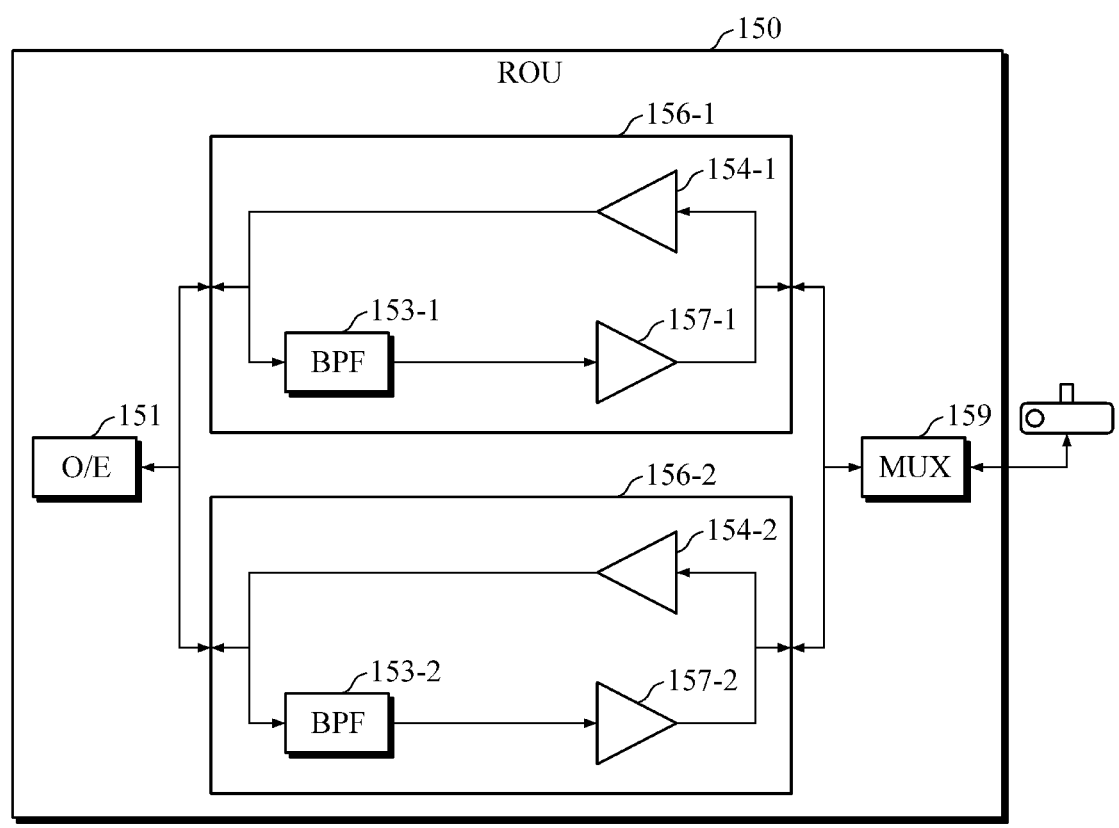
FIGS. 9 to 11 are block diagrams illustrating embodiments of a remote optical unit in the exemplary embodiments shown in FIGS. 3 to 5.

FIG. 9 is a block diagram illustrating one embodiment of a configuration of the remote optical units 150-1 and 150-2 in the exemplary embodiments shown in FIGS. 3 to 5. Referring to FIG. 9, the remote optical unit 150 includes three types of modules which are the photoelectric conversion unit 151 configured to convert optical RF signals received from ODUs 130 into electrical RF signals, the plurality of RDUs 156-1 and 156-2, and a combine unit 159 configured to combine signals generated from the RDUs. In one exemplary embodiment, the remote optical unit 150 may include the plurality of RDUs 156-1 and 156-2. The RDUs may have different configurations from each other.

The RDU 156-1 includes a bandpass filter 153-1 which filters only a required band in an RF signal on a downlink path, and a power amplifier 157-1 which amplifies the filtered RF signal. The RDU 156-1 includes a low noise amplifier 154-1 which amplifies a signal from an antenna on an uplink path.

The RDU 156-2 includes a bandpass filter 153-2 which filters only a required band in the RF signal on the downlink path, and a power amplifier 157-2 which amplifies the filtered RF signal. The RDU 156-2 includes a low noise amplifier 154-2 which amplifies the signal from the antenna on the uplink path. Outputs from the two RDUs 156-1 and 156-2 are combined by the combine unit 159 and are transmitted to a single antenna.

In this case, the bandpass filter 153-1 of the RDU 156-1 and the bandpass filter 153-2 of the RDU 156-2 may have different pass bands. A plurality of RF signals with different bands may be multiplexed and transmitted through a single optical fiber.

In the illustrated exemplary embodiments, the remote optical unit 150 may have a suitable configuration capable of transmitting RF signals of two different bands which are output from the headend unit 100.

Figure 10:
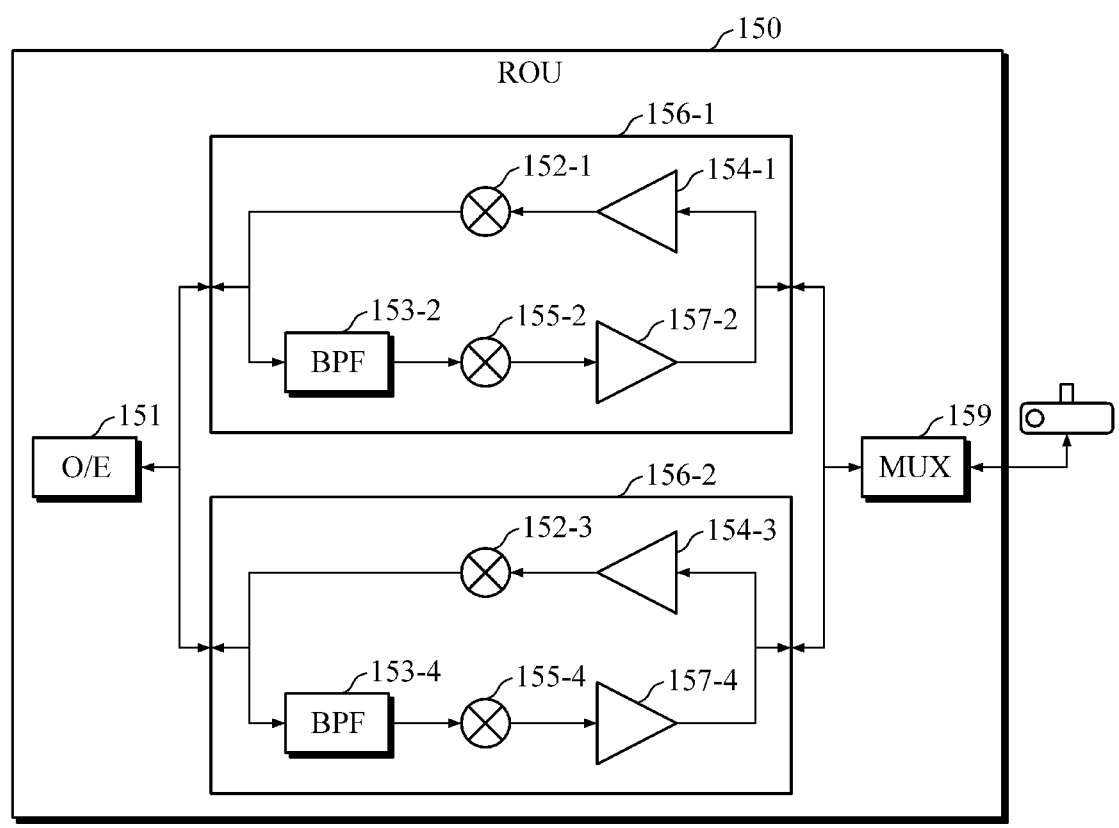

FIG. 10 is a block diagram illustrating another embodiment of a configuration of the remote optical units 150-1 and 150-2 in the exemplary embodiments shown in FIGS. 3 to 5. Referring to FIG. 10, the remote optical unit 150 includes three types of modules which are the photoelectric conversion unit 151 configured to convert the optical RF signals received from the ODUs 130 into electrical RF signals, the plurality of RDUs 156-1 and 156-2, and the combine unit 159 configured to combine signals generated from the RDUs. In the exemplary embodiment, the remote optical unit 150 may include the plurality of RDU modules 156-1 and 156-2. The RDUs may have different configurations from each other.

The RDU 156-1 includes the bandpass filter 153-2 which filters only a required band in an RF signal on a downlink path, a demodulation unit 155-2 which demodulates the filtered RF signal by converting a band of the signal when necessary, and the power amplifier 157-2 which amplifies the demodulated signal. The RDU 156-1 includes the low noise amplifier 154-1 which amplifies a signal from an antenna on an uplink path, and a modulation unit 152-1 which modulates the amplified signal by converting a band of the signal when necessary.

The RDU 156-2 includes a bandpass filter 153-4 which filters only a required band in the RF signal on the downlink path, a demodulation unit 155-4 which demodulates the filtered RF signal by converting a band of the signal when necessary, and a power amplifier 157-4 which amplifies the demodulated signal. The RDU 156-2 includes a low noise amplifier 154-3 which amplifies the signal from the antenna on the uplink path and a modulation unit 152-3 which modulates the amplified signal by converting a band of the signal when necessary. The modulated signal outputs from the two RDUs 156-1 and 156-2 are in different bands.

According to one aspect, the headend unit may modulate RF signals of the same bands and transmit the modulated signals in order to increase coverage or capacity. These RF signals of different bands are transmitted through different remote optical units. Outputs of the two RDUs 156-1 and 156-2 having different frequencies are combined by the combine unit 159 and are transmitted to a single antenna.

Figure 11:
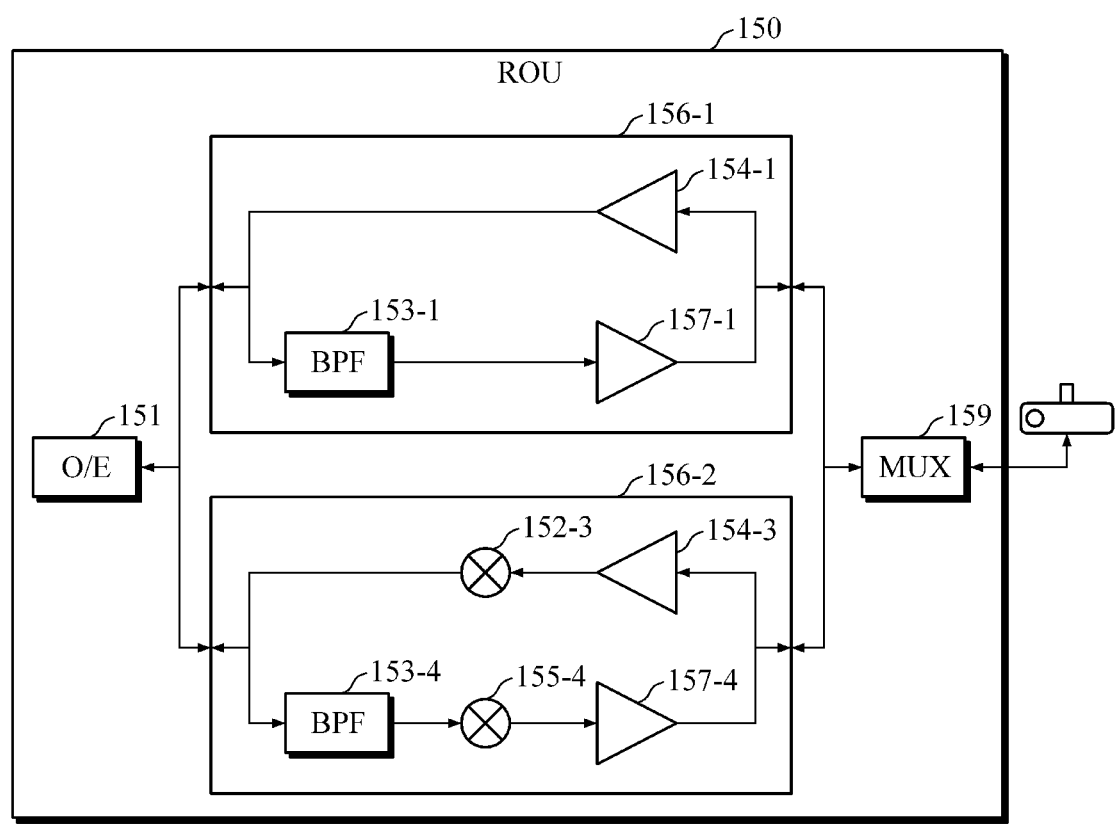

FIG. 11 is a block diagram illustrating still another embodiment of a configuration of the remote optical units 150-1 and 150-2 in the exemplary embodiments shown in FIGS. 3 to 5. Referring to FIG. 11, the remote optical unit 150 includes three types of modules which are the photoelectric conversion unit 151 configured to convert the optical RF signals received from the ODUs 130 into electrical RF signals, the plurality of RDUs 156-1 and 156-2, and the combine unit 159 configured to combine signals generated from the RDUs. In one exemplary embodiment, the remote optical unit 150 may include the plurality of RDU modules 156-1 and 156-2. The RDUs may have different configurations from each other.

The RDU 156-1 includes the bandpass filter 153-1 which filters only a required band in an RF signal on a downlink path, and the power amplifier 157-1 which amplifies the filtered RF signal. The RDU 156-1 includes the low noise amplifier 154-1 which amplifies a signal from an antenna on an uplink path.

The RDU 156-2 includes the bandpass filter 153-4 which filters only a required band in the RF signal on the downlink path, the demodulation unit 155-4 which demodulates the filtered RF signal by converting a band of the signal when necessary, and the power amplifier 157-4 which amplifies the demodulated signal. The RDU 156-2 includes the low noise amplifier 154-3 which amplifies the signal from the antenna on the uplink path, and the modulation unit 152-3 which modulates the amplified signal by converting a band of the signal when necessary. Outputs of the two RDUs 156-1 and 156-2 are combined by the combine unit 159 and are transmitted to a single antenna.

In the illustrated exemplary embodiment, since the RDU 156-1 does not include a modulation/demodulation unit, the RDU 156-1 performs bandpass filtering on the RF signal output from the headend unit 100, then amplifies the filtered signal and outputs the amplified signal. The RDU 156-2 extracts an RF signal of a specific frequency band using the bandpass filter 153-4, demodulates the extracted RF signal through band-down conversion using the modulation/demodulation unit 155-4, and outputs a resulting signal.

In the exemplary embodiments illustrated in FIGS. 3 to 5, scalability of the small cell is addressed from two perspectives. One is the number of users, and the other is bandwidth, i.e., total throughput. The proposed invention can improve both the number of users and the bandwidth/throughput. According to one aspect, the common controller 213 may additionally activate the upper protocol processor 211 in the upper small cell unit 210, thereby increasing the number of users that can be supported. According to another aspect, the common controller 213 may allocate more computational resources, for example, memory or CPU resources, to the upper protocol processor 211 being executed in the upper small cell unit 210, thereby enabling the increase of the number of users.

According to still another aspect, the common controller 213 may additionally activate the lower protocol processor 231 being executed in the lower small cell unit 230, thereby increasing the bandwidth that can be supported. According to yet another aspect, the common controller 213 may allocate more computational resources, for example, memory or CPU resources, to the lower protocol processor 231 being executed in the lower small cell unit 230, thereby enabling the increase of the bandwidth. In this case, the common controller 213 may need to appropriately control the first matching switch 250 or the second matching switch 250 in the lower small cell unit 230. Hereinafter, the above-described aspects will be described in detail with reference to FIGS. 12 to 16.

Figure 12:
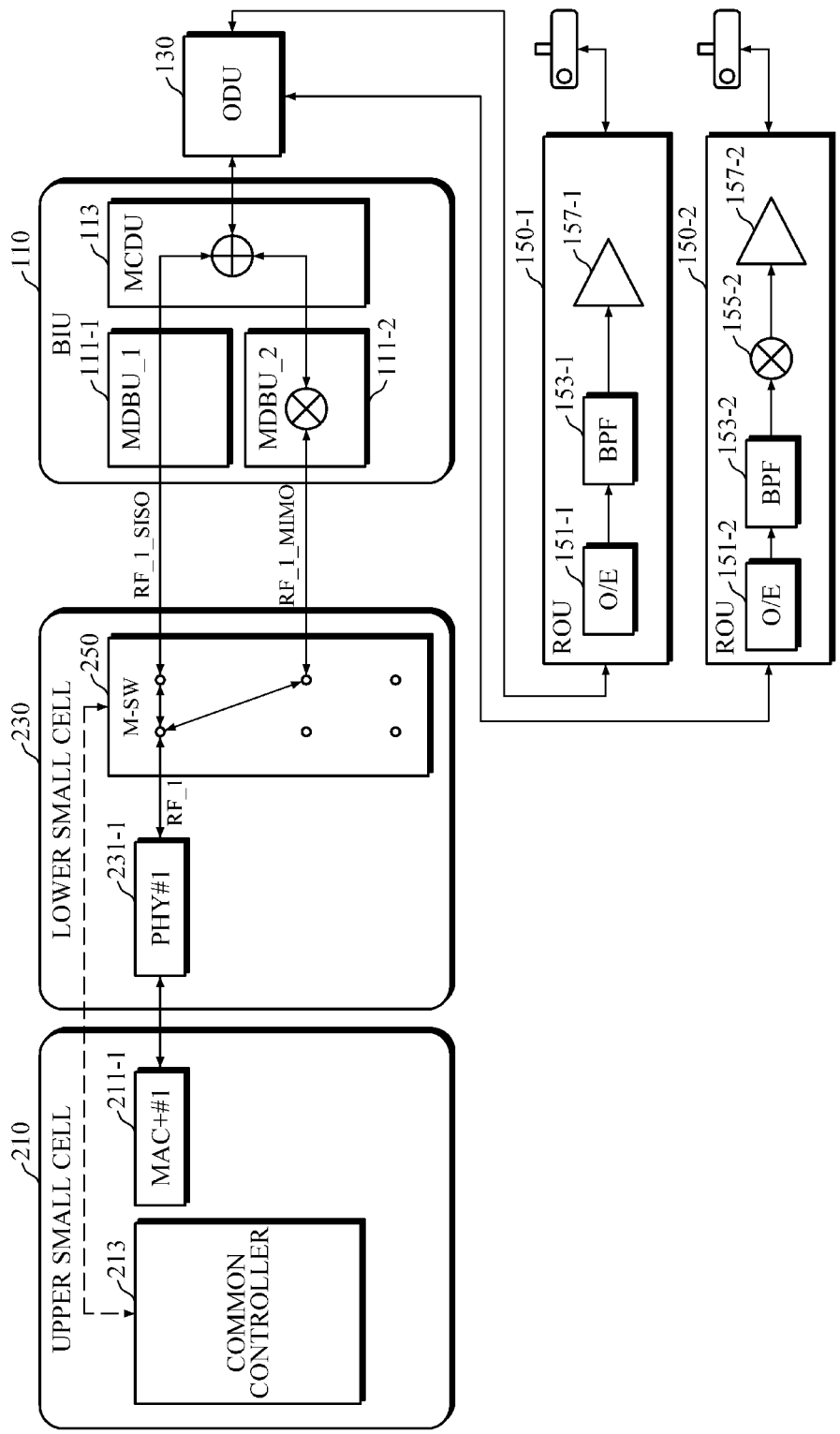
FIG. 12 is a diagram for describing a first operation mode of a cellular communication system according to one exemplary embodiment.

FIG. 12 is a diagram for describing a first operation mode of a cellular communication system in accordance with the exemplary embodiment shown in FIG. 3. In the illustrated first operation mode, only one upper protocol processor 211-1 is being executed in the upper small cell unit 210, and only one lower protocol processor 231-1 is being executed in the lower small cell unit 230. The first matching switch 250 distributes output from the lower protocol processor 231-1, i.e., a PHY layer 231-1, into two signals and transmits the two signals to two input ports, which are an RF_1_SISO port and an RF_1_MIMO port of the BIU 110.

In the illustrated exemplary embodiment, the BIU 110 includes two types of base-station signal driving units 111-1 and 111-2, one of which does not include a demodulator but has the RF_1_SISO input port, and the other of which includes a demodulator and has the RF_1_MIMO input port. Alternatively, both of the base-station signal driving units 111-1 and 111-2 may have the same configurations and may include demodulator modules therein, but the base-station signal driving unit 111-1 may be configured not to use the included demodulator module and the base-station signal driving unit 111-2 may be configured to use the included demodulator module. In this case, a band of a signal output from the base-station signal driving unit 111-1 is represented as RF_1_SISO, and a band of a signal output from the base-station signal driving unit 111-2 is represented as RF_1_MIMO.

The common controller 213 has information about such a system configuration, and controls the first matching switch 250 according to the information so that interference among RF signals of the same frequency band can be avoided.

The two base-station signal driving units 111-1 and 111-2 of the BIU 110 each receive the distributed RF signal. The base-station signal driving unit 111-1, which receives the RF signal through the RF_1_SISO input port, outputs the received RF signal intact to the combine-divider 113. The base-station signal driving unit 111-2, which receives the RF signal through the RF_1_MIMO input port, modulates the RF signal to up or down convert a band thereof, and outputs a resulting signal to the combine-divider 113. The combine-divider 113 mixes the two RF signals and outputs a mixture of the RF signals to the ODU 130. The reason why the base-station signal driving unit 111-2 modulates the RF signal is because otherwise the mixed signal output from the combine-divider 113 cannot be separated later.

The ODU 130 converts the mixed signal into an optical RF signal and distributes the optical RF signal. The remote optical units 150-1 and 150-2 receive the distributed optical RF signal. In the illustrated exemplary embodiment, the remote optical unit 150-1 has a suitable configuration capable of transmitting an RF signal of an RF_1_SISO band, which is output from the base-station signal driving unit 111-1 of the BIU 110. In addition, the remote optical unit 150-2 has a suitable configuration capable of transmitting an RF signal of an RF_1_MIMO band, which is output from the base-station signal driving unit 111-2 of the BIU 110. That is, the remote optical unit 150-1 does not include a modulation/demodulation unit, while the remote optical unit 150-2 includes a modulation/demodulation unit to convert the RF signal of the RF_1_MIMO band into an RF signal of the RF_1_SISO band.

The remote optical unit 150-1 photoelectrically converts the received optical RF signal into an electrical RF signal, then extracts an RF signal of a specified frequency band, i.e., the RF_1_SISO band, using the bandpass filter, amplifies the RF signal, and transmits the amplified signal to the antenna. The remote optical unit 150-2 photoelectrically converts the received optical RF signal into an electrical RF signal, then extracts an RF signal of another specified frequency band, i.e., the RF_1_MIMO band, using the bandpass filter, up or down converts a band of the extracted RF signal to a specified frequency band, amplifies the converted signal, and outputs a resulting signal to the antenna. Consequently, the two remote optical units 150-1 and 150-2 transmit the same data through RF signals of the same band. Since the two remote optical units 150-1 and 150-2 provide services to different floors of a building, coverage may be expanded.

Figure 13:
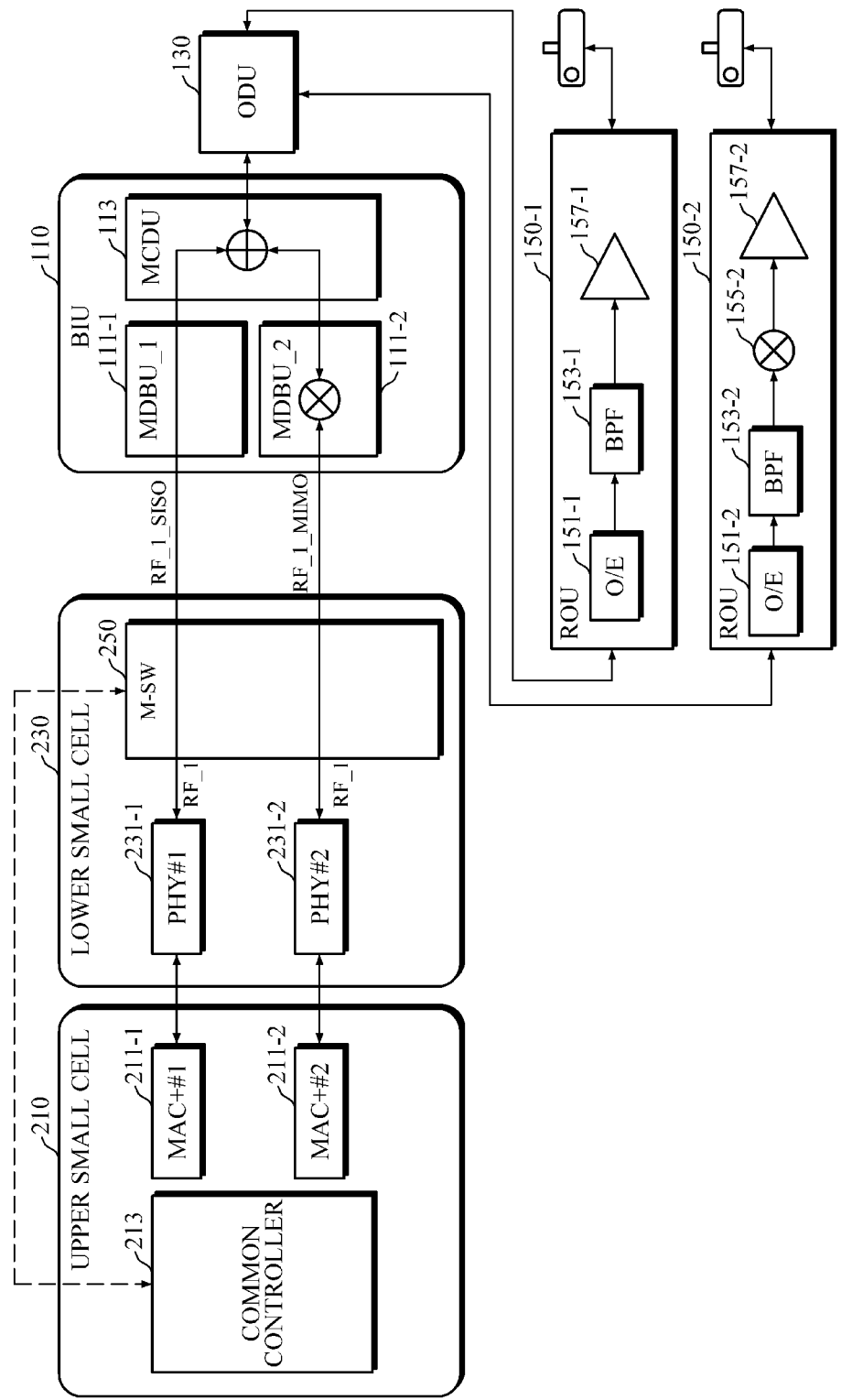
FIG. 13 is a diagram for describing a second operation mode of a cellular communication system according to one exemplary embodiment.

FIG. 13 is a diagram for describing a second operation mode of the cellular communication system in accordance with the exemplary embodiment shown in FIG. 3. The second operation mode described herein is an example of a response that the system in accordance with the proposed invention may make when it is necessary to increase the number of users and the bandwidth/capacity in the first operation mode illustrated in FIG. 12.

According to one aspect, when it is necessary to increase bandwidth or capacity, the common controller 213 controls an operation of the first matching switch and controls whether the headend unit performs modulation. In the illustrated second operation mode, the common controller 213 generates and executes new tasks such that the common controller 213 generates and executes a new upper protocol processor 211-2 and a new lower protocol processor 231-2 and connects both of the processors. In this case, MAC+#2 processes different data as the new upper protocol processor 211-2 from data processed by MAC+#1. In the illustrated second operation mode, the new lower protocol processor 231-2 outputs a signal of the same frequency band as that of the existing lower protocol processor 231-1.

The first matching switch 250 disconnects the existing connection between the lower protocol processor PHY#1 231-1 and the RF_1_MIMO input port of the base-station signal driving unit 111-2, and connects the newly generated and executed lower protocol processor PHY#2 231-2 to the RF_1_MIMO input port of the base-station signal driving unit 111-2. The two upper protocol processors 211-1 and 211-2 and the two lower protocol processors 231-1 and 231-2 are executed, which is generally identical to the case of two small cells being executed.

The two base-station signal driving units 111-1 and 111-2 of the BIU 110 receive RF signals through two input ports. The base-station signal driving unit 111-1 outputs the received RF signal intact to the combine-divider 113. The base-station signal driving unit 111-2 modulates the received RF signal to up or down convert a band thereof, and outputs a resulting signal to the combine-divider 113. The reason why the base-station signal driving unit 111-2 modulates the RF signal is because otherwise the mixed signal output from the combine-divider 113 cannot be separated later.

The ODU 130 converts the mixed signal into an optical RF signal and distributes the optical RF signal. The remote optical units 150-1 and 150-2 receive the distributed optical RF signal. The remote optical unit 150-1 photoelectrically converts the received optical RF signal into an electrical RF signal, then extracts an RF signal of a specified frequency band, i.e., the RF_1_SISO band, using the bandpass filter, amplifies the RF signal, and transmits the amplified signal to the antenna. The remote optical unit 150-2 photoelectrically converts the received optical RF signal into an electrical RF signal, then extracts an RF signal of another specified frequency band, i.e., the RF_1_MIMO band, using the bandpass filter, up or down converts a band of the extracted RF signal to a specified frequency band, amplifies a converted signal, and outputs a resulting signal to the antenna. Consequently, since the two remote optical units 150-1 and 150-2 transmit different LTE data through RF signals of the same band, it is possible to form two mobile communication cells and to double the number of users and the bandwidth/capacity in comparison to the first operation mode illustrated in FIG. 12.

Figure 14:
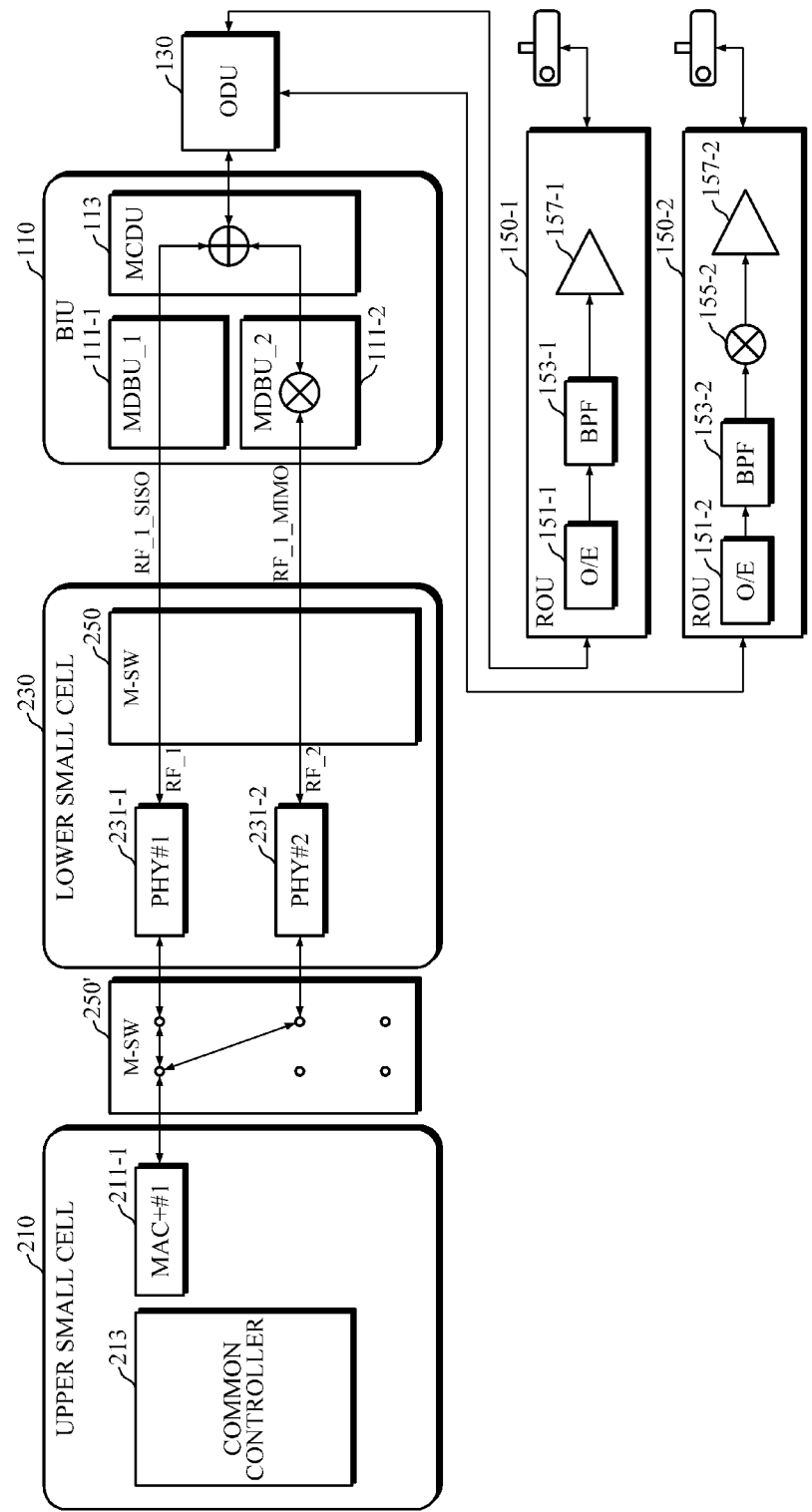
FIG. 14 is a diagram for describing a third operation mode of the cellular communication system in accordance with the exemplary embodiment shown in FIG. 4 or 5.

FIG. 14 is a diagram for describing a third operation mode of the cellular communication system in accordance with the exemplary embodiment shown in FIG. 4 or 5. The third operation mode described herein is an example of a response that the system in accordance with the proposed invention may make when a necessity to increase bandwidth/capacity used by users arises in the first operation mode illustrated in FIG. 12.

According to one aspect, when it is necessary to increase bandwidth/capacity, the common controller 213 additionally activates the lower protocol processor, controls an operation of the first matching switch, and controls whether the lower protocol processor performs modulation. In the illustrated third operation mode, the common controller 213 generates and executes new tasks such that the common controller 213 generates and executes a new lower protocol processor 231-2. The common controller 213 controls the second matching switch 250' to connect the newly generated lower protocol processor 231-2 to the upper protocol processor 211-1.

In the illustrated third operation mode, the new lower protocol processor 231-2 outputs a signal of the same frequency band as that of the existing lower protocol processor 231-1.

The first matching switch 250 disconnects the existing connection between the lower protocol processor PHY#1 231-1 and the RF_1_MIMO input port of the base-station signal driving unit 111-2, and connects the newly generated and executed lower protocol processor PHY#2 231-2 to the RF_1_MIMO input port of the base-station signal driving unit 111-2.

The base-station signal driving units 111-1 and 111-2 of the BIU 110 receive RF signals through two input ports. The base-station signal driving unit 111-1 outputs the received RF signal intact to the combine-divider 113. The base-station signal driving unit 111-2 modulates the received RF signal to up or down convert a band thereof, and outputs a resulting signal to the combine-divider 113. The reason why the base-station signal driving unit 111-2 modulates the RF signal is because otherwise the mixed signal output from the combine-divider 113 cannot be separated later.

The ODU 130 converts the mixed signal into an optical RF signal and distributes the optical RF signal. The remote optical units 150-1 and 150-2 receive the distributed optical RF signal. The remote optical unit 150-1 photoelectrically converts the received optical RF signal into an electrical RF signal, then extracts an RF signal of a specified frequency band, i.e., the RF_1_SISO band, using the bandpass filter, amplifies the RF signal, and transmits the amplified signal to the antenna. The remote optical unit 150-2 photoelectrically converts the received optical RF signal into an electrical RF signal, then extracts an RF signal of another specified frequency band, i.e., the RF_1_MIMO band, using the bandpass filter, up or down converts a band of the extracted RF signal to a specified frequency band, amplifies the converted signal, and outputs a resulting signal to the antenna. Consequently, the bandwidths of both the remote optical units 150-1 and 150-2 can be widened more than that of the first operation mode of FIG. 12.

In the first to third operation modes shown in FIGS. 12 to 14, extending coverage is dependent on the modulation/demodulation in the base-station signal driving unit of the headend unit and the modulation/demodulation in the corresponding remote unit. However, aspects of the proposed invention are not limited to the above, that is, by controlling the wireless converters, as shown in FIGS. 6 to 8, to convert a signal into a different frequency band that is used by the same service operator, the modulation/demodulation in the headend side may not be necessary. Although such an aspect may be applied to any operation mode which has been described with reference to FIG. 12 to 14 or will be described below, an exemplary operation in a case in which the aspect is applied to the second operation mode shown in FIG. 13 will be described herein.

Figure 15:
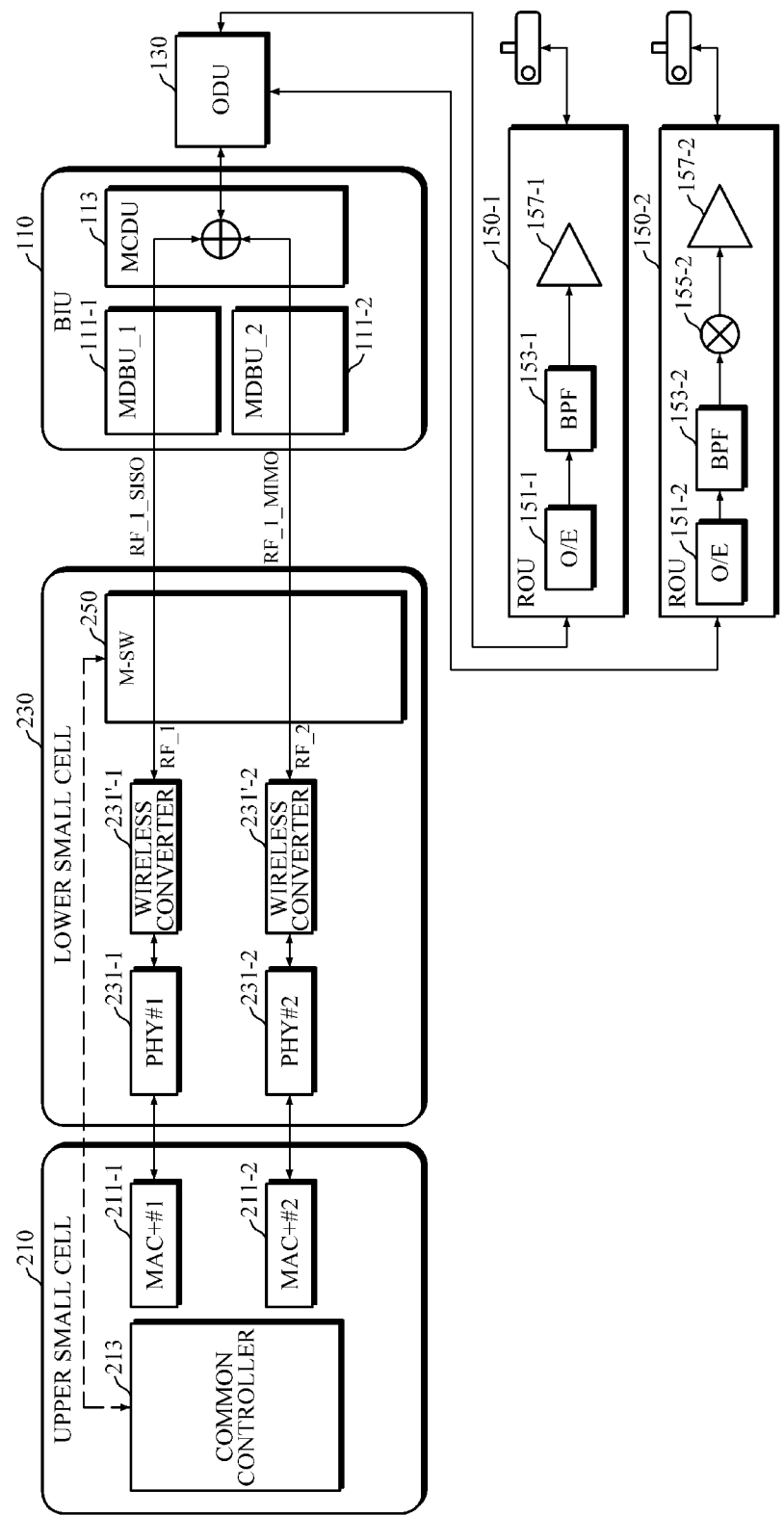
FIG. 15 is a diagram illustrating another example of cellular communication system that implements the second operation mode described with reference to FIG. 13.

FIG. 15 is a diagram illustrating an example of another cellular communication system that implements the second operation mode described with reference to FIG. 13. The example shown in FIG. 15 is substantially the same as the exemplary embodiment of FIG. 13, but the base-station signal driving unit 111-2 and the corresponding remote unit 150-2 do not need a modulation/demodulation unit. Rather, the lower protocol processors of the lower baseband unit 230 are connected with the wireless converters 231'-1 and 231'-2, respectively. As should be apparent to those skilled in the art, the respective lower protocol processors of the exemplary embodiments illustrated in FIGS. 12 to 14 require wireless converters, which are simply omitted in the drawings. The difference between the above embodiments and the present embodiment is that modulation/demodulation frequencies of the wireless converters are controlled by the common controller 213.

Mobile communication service operators use multiple frequencies for the same service in order to support as much bandwidth and/or as many users as possible. Terminal devices search all of multiple frequencies for services of the same service operator. The common controller 213 controls modulation/demodulation frequencies of the wireless converters in order to increase the number of users and/or the bandwidth. For example, in the exemplary embodiment shown in FIG. 15, the upper protocol processor 211-1 and the lower protocol processor 231-2 are additionally activated for the same service operator, and the wireless converter 231'-1 and the wireless converter 231'-2 are controlled to select two of the multiple frequencies used by the service operator and modulate/demodulate the selected frequencies. In this case, the bandpass filter 153-1 of the remote unit 150-1 is tuned to a band of the wireless converter 231'-1, and the bandpass filter 153-2 of the remote unit 150-2 is tuned to a band of the wireless converter 231'-2. As such, the coverage as well as the bandwidth and the number of users can be substantially increased for the same service operator. Although the exemplary embodiment of FIG. 15 employs the configuration illustrated in FIG. 6, it should be understood by those skilled in the art that the configuration of FIG. 7 or 8 can be applied to FIG. 13 through the exemplary embodiment of FIG. 15.

Similar schemes use the configurations illustrated in FIGS. 6 to 8, and may be applied to the exemplary embodiment of FIG. 14.

Figure 16:
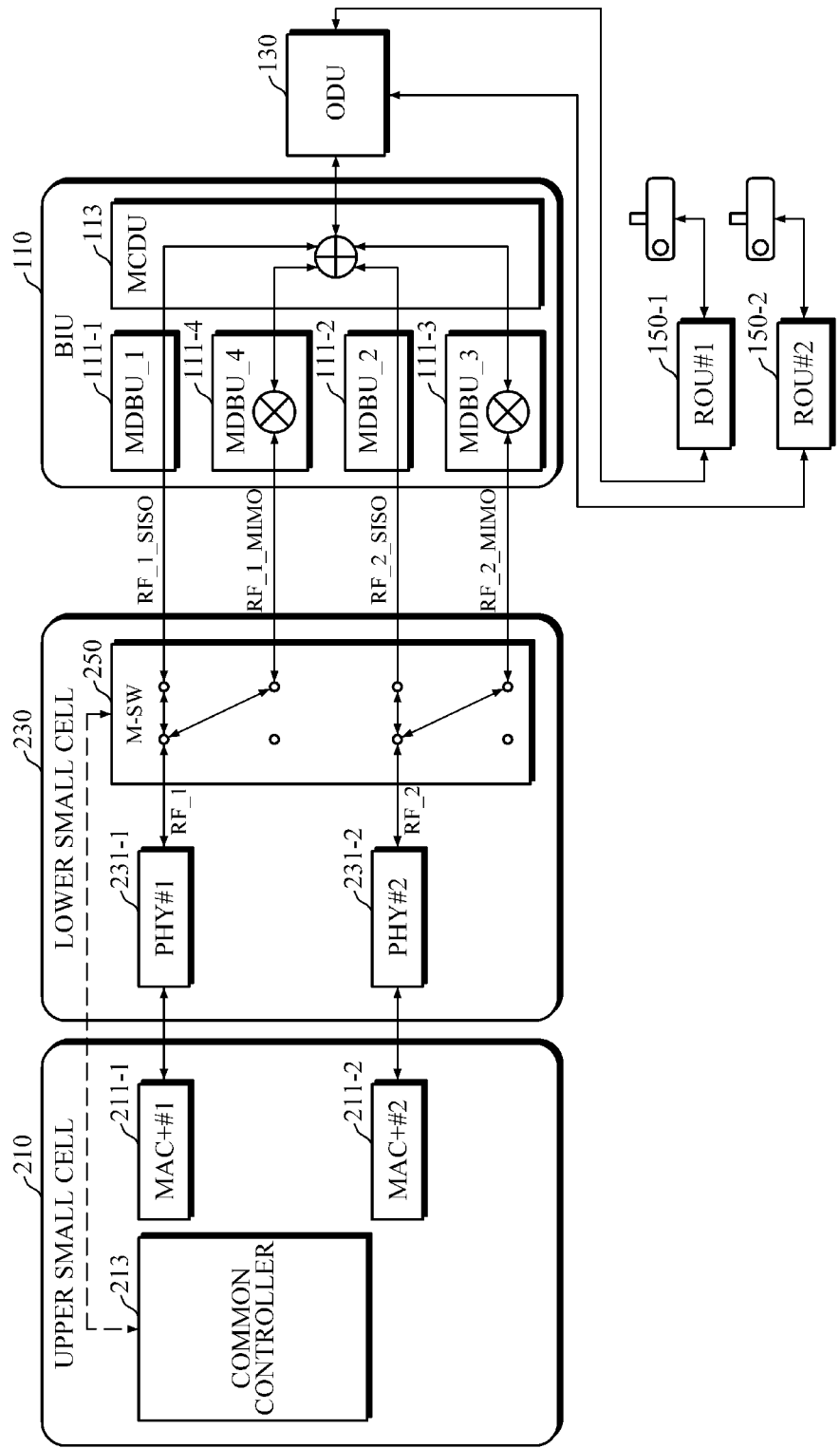
FIG. 16 is a diagram for describing a fifth operation mode of the cellular communication system in accordance with the exemplary embodiment illustrated in FIG. 3 or 5.

FIG. 16 is a diagram for describing a fifth operation mode of the cellular communication system in accordance with the exemplary embodiment illustrated in FIG. 3 or 5. When it is necessary to increase the number of users or the throughput in the first operation mode as illustrated in FIG. 12, the fifth operation mode may be initiated. Alternatively, the fifth operation mode may be initiated in order to increase the throughput in the second operation mode illustrated in FIG. 13. In the fifth operation mode, the common controller 213 generates and executes the additional upper protocol processor 211-2 in the upper small cell unit 210, generates and executes the additional lower protocol processor 231-2 in the lower small cell unit 230, and connects the upper protocol processor 211-2 and the lower protocol processor 231-2. In the case where PHY#1 and PHY#2 are hardware circuits, the common controller 213 transmits only an output of the newly executed upper protocol processor 211-2 to PHY#2.

MAC+#1, which is the existing upper protocol processor 211-1, outputs data D1, while MAC+#2, which is the newly executed upper protocol processor 211-2, outputs data D2. PHY#1, which is the existing lower protocol processor 231-1, transmits a signal of an RF_1 band, while PHY#2, which is the newly executed lower protocol processor 231-2, outputs a signal of an RF_2 band.

The first matching switch 250 distributes each output of each lower protocol processor 231-1 and 231-2, i.e., PHY#1 and PHY#2 231-1 and 231-2, into two, and transmits the distributed output to one pair of the RF_1_SISO port and the RF_1_MIMO port and the other pair of an RF_2_SISO port and an RF_2_MIMO port, which are pairs of input ports of the BIU 110.

In the illustrated exemplary embodiment, the BIU 110 includes two activated base-station signal driving units 111-1 and 111-4 that receive RF signals of the RF_1 band as an input such that one base-station signal driving unit does not include a modulator but has the RF_1_SISO input port while the other includes a modulator and has the RF_1_MIMO input port. In this case, a band of the signal output from the base-station signal driving unit 111-1 is represented as RF_1_SISO, and a band of the signal output from the base-station signal driving unit 111-4 is represented as RF_1_MIMO.

In the illustrated exemplary embodiment, the BIU 110 includes two activated base-station signal driving units 111-2 and 111-3 that receive RF signals of the RF_2 band as inputs such that one base-station signal driving unit does not include a modulator but has the RF_2_SISO input port while the other includes a modulator and has the RF_2_MIMO input port. In this case, a band of the signal output the base-station signal driving unit 111-2 is represented as RF_2_SISO, and a band of the signal output from the base-station signal driving unit 111-3 is represented as RF_2_MIMO.

The common controller 213 has information about such a system configuration, and controls the first matching switch 250 according to the information so that interference among RF signals of the same frequency band can be avoided.

The two base-station signal driving units 111-1 and 111-4 of the BIU 110 each receive the distributed RF signal. The base-station signal driving unit 111-1, which receives the RF signal through the RF_1_SISO input port, outputs the received RF signal intact to the combine-divider 113. The base-station signal driving unit 111-4, which receives the RF signal through the RF_1_MIMO input port, modulates the RF signal to up or down convert a band thereof, and outputs a resulting signal to the combine-divider 113.

The two base-station signal driving unit 111-2 and 111-3 of the BIU 110 each receive the distributed RF signal. The base-station signal driving unit 111-2, which receives the RF signal through the RF_2_SISO input port, outputs the received RF signal intact to the combine-divider 113. The base-station signal driving unit 111-3, which receives the RF signal through the RF_2_MIMO input port, modulates the RF signal to up or down convert a band thereof, and outputs a resulting signal to the combine-divider 113.

The combine-divider 113 mixes the four signals and outputs a mixture of the signals to the ODU 130. The ODU 130 converts the mixed signal into an optical RF signal and distributes the optical RF signal.

The remote optical units 150-1 and 150-2 receive the distributed optical RF signal.

In the illustrated exemplary embodiment, the remote optical unit 150-1 may be configured as the exemplary embodiment of FIG. 9 and the remote optical unit 150-2 may be configured as the exemplary embodiment of FIG. 10. The operations of the remote optical units 150-1 and 150-2 in accordance with the exemplary embodiment of FIG. 18 will be described with reference to FIGS. 9 and 10.

Referring to FIG. 9, the remote optical unit 150-1 processes signals of two channels and has a configuration suitable to transmit RF signals of two bands, i.e., the RF_1_SISO band and the RF_2_SISO band, which are output from the base-station signal driving units 111-1 and 111-2 of the BIU 110.

An upper channel of the remote optical unit 150-1 extracts an RF signal of a specified frequency band, i.e., the RF_1_SISO band, from a photoelectrically converted RF signal output from the photoelectric conversion unit (151) through the bandpass filter 153-1, amplifies the extracted RF signal, and outputs a resulting signal to the antenna. A lower channel of the remote optical unit 150-1 extracts an RF signal of a specified frequency band, i.e., the RF_2_SISO band, from the photoelectrically converted RF signal output from the photoelectric conversion unit (151) through the bandpass filter 153-2, amplifies the extracted RF signal, and outputs a resulting signal to the antenna. The RF signal of RF_1_SISO band and the RF signal of RF_2_SISO band are mixed in a forward direction by the combine unit 159 and then transmitted to the antenna. Descriptions of an uplink will be omitted.

Referring to FIG. 10, the remote optical unit 150-2 processes signals of two channels and has a configuration suitable to transmit RF signals of two bands, i.e., the RF_1_MIMO band and the RF_2_MIMO band, which are output from the base-station signal driving units 111-3 and 111-4 of the BIU 110. More specifically, the remote optical unit 150-1 does not include a modulation/demodulation unit, whereas the remote optical unit 150-2 includes the modulation/demodulation unit 155-2, which converts the RF signal of the RF_1_MIMO band into an RF signal of the RF_1 band, and the modulation/demodulation unit 155-4, which converts the RF signal of the RF_2_MIMO band into an RF signal of the RF_2 band.

An upper channel of the remote optical unit 150-2 extracts an RF signal of another specified frequency band, i.e., the RF_1_MIMO band, from a photoelectrically converted RF signal output from the photoelectric conversion unit (151) through the bandpass filter 153-2, demodulates the extracted RF signal to a specified frequency band, i.e., the RF_1 band, through band-down conversion by the modulation/demodulation unit 155-2, amplifies the demodulated RF signal in the amplifier 157-2, and outputs a resulting signal to the antenna. A lower channel of the remote optical unit 150-2 extracts an RF signal of another frequency band, i.e., the RF_2_MIMO band, from the photoelectrically converted RF signal through the bandpass filter 153-4, demodulates the extracted RF signal to a specified frequency band, i.e., the RF_2 band, through band-down conversion by the modulation/demodulation unit 155-4, amplifies the demodulated RF signal in the amplifier 157-4, and outputs a resulting signal to the antenna. The RF signal of the RF_1_MIMO band and the RF signal of the RF_2_MIMO band are mixed in the forward direction by the combine unit 159 and then transmitted to the antenna. Descriptions of an uplink will be omitted.

As a result, both of the remote optical units 150-1 and 150-2 transmit the data D1 through the RF signal of the RF_1 band and the data D2 through the RF signal of the RF_2 band. That is, since different data D1 and D2 are transmitted using two frequency bands RF_1 and RF_2, it is the same as functions of two cells or a single cell sectorized into two sectors.

Figure 17:
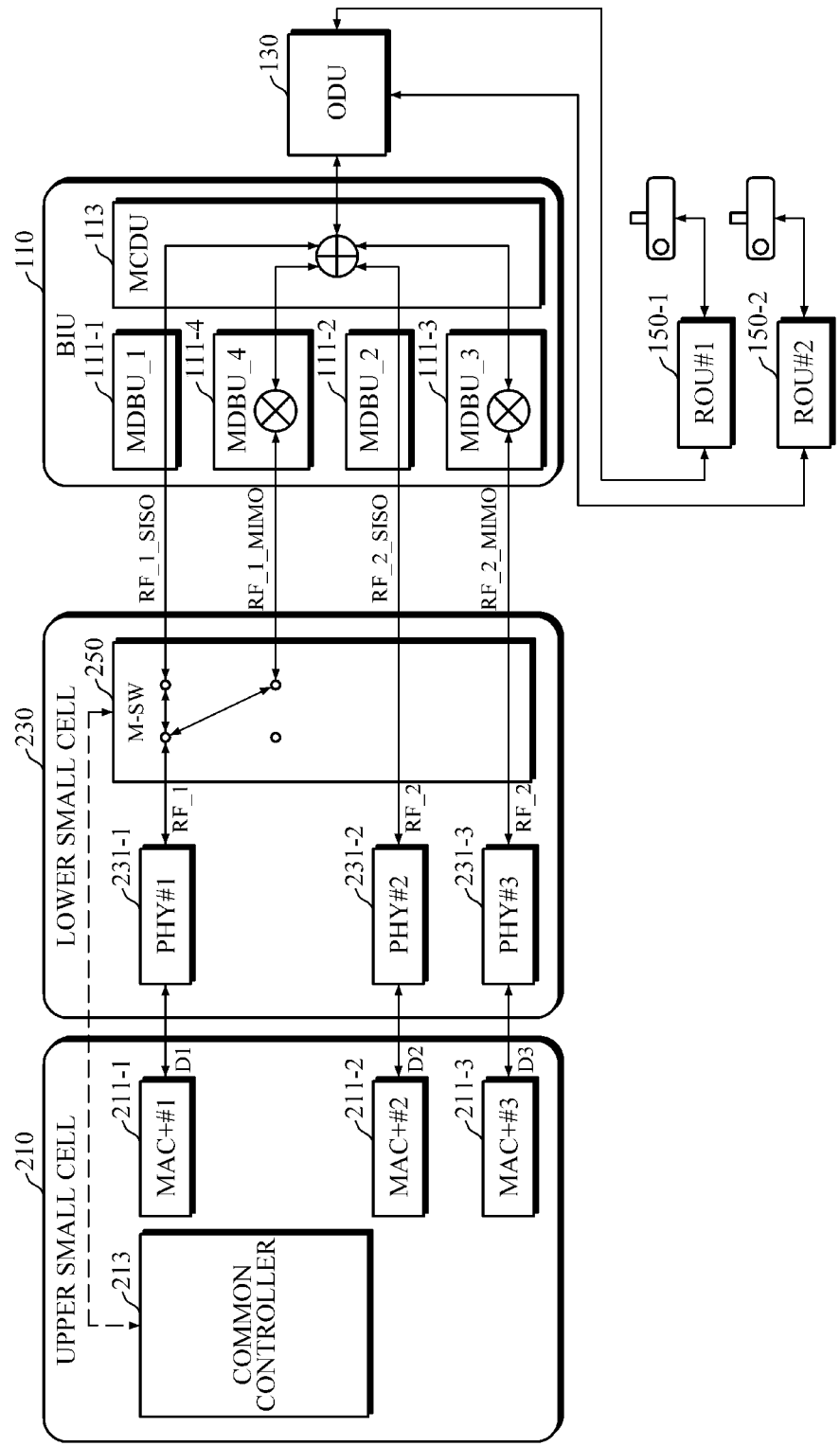
FIG. 17 is a diagram for describing a sixth operation mode of the cellular communication system in accordance with the exemplary embodiment illustrated in FIG. 3 or 5.

FIG. 17 is a diagram for describing a sixth operation mode of the cellular communication system in accordance with the exemplary embodiment illustrated in FIG. 3 or 5. When it is necessary to additionally increase the throughput in the fifth operation mode as illustrated in FIG. 16, the sixth operation mode may be initiated. In the sixth operation mode, the common controller 213 generates and executes another additional upper protocol processor 211-3 in the upper small cell unit 210, generates and executes another additional lower protocol processor 231-3 in the lower small cell unit 230, and connects the upper protocol processor 211-3 and the lower protocol processor 231-3. In the case where PHY#1, PHY#2, and PHY#3 are hardware circuits, the common controller 213 transmits only an output of the newly executed upper protocol processor 211-3 to PHY#3.

MAC+#1 and MAC+#2, which are the existing upper protocol processors 211-1 and 211-2, output data D1 and data D2, respectively, while MAC+#3, which is the newly executed upper protocol processor 211-3, outputs data D3. PHY#1, which is the existing lower protocol processor 231-1, transmits a signal of the RF_1 band, while PHY#3, which is the newly executed lower protocol processor 231-3, outputs a signal of the RF_2 band as does the existing lower protocol processor 213-2.

In the same manner as above, the first matching switch 250 distributes an output of the lower protocol processor 231-1, i.e., PHY#1, into two signals, and transmits the distributed output to the RF_1_SISO port and the RF_1_MIMO port, which are input ports of the BIU 110.

Also, the first matching switch 250 connects output of the lower protocol processor 231-2, i.e., PHY#2, with the RF_2_SISO port, which is an input port of the BIU 110. In addition, the first matching switch 250 disconnects the existing connection between the lower protocol processor 231-2, i.e., PHY#2, and the RF_2_MIMO input port of the BIU 110, and connects the newly generated and executed lower protocol processor 231-3, i.e., PHY#2 231-2, with the RF_2_MIMO input port of the BIU 110.

In the illustrated exemplary embodiment, the BIU 110 includes two activated base-station signal driving units 111-1 and 111-4 that receive RF signals of the RF_1 band as an input such that one base-station signal driving unit does not include a modulator but has the RF_1_SISO input port while the other includes a modulator and has the RF_1_MIMO input port. In this case, a band of the signal output from the base-station signal driving unit 111-1 is represented as RF_1_SISO, and a band of the signal output from the base-station signal driving unit 111-4 is represented as RF_1_MIMO.

In the illustrated exemplary embodiment, the BIU 110 includes two activated base-station signal driving units 111-2 and 111-3 that receive RF signals of the RF_2 band as an input such that one base-station signal driving unit does not include a modulator/demodulator but has the RF_2_SISO input port while the other includes a modulator/demodulator and has the RF_2_MIMO input port. In this case, a band of the signal output from the base-station signal driving unit 111-2 is represented as RF_2_SISO, and a band of the signal output from the base-station signal driving unit 111-3 is represented as RF_2_MIMO.

The common controller 213 has information about such a system configuration, and controls the first matching switch 250 according to the information so that interference among RF signals of the same frequency band can be avoided.

The two base-station signal driving unit 111-1 and 111-4 of the BIU 110 each receive the distributed RF signal. The base-station signal driving unit 111-1, which receives the RF signal through the RF_1_SISO input port, outputs the received RF signal intact to the combine-divider 113. The base-station signal driving unit 111-4, which receives the RF signal through the RF_1_MIMO input port, modulates the RF signal to up or down convert a band thereof, and outputs a resulting signal to the combine-divider 113.

The two base-station signal driving unit 111-2 and 111-3 of the BIU 110 receive the RF signal from PHY#2 and PHY#3, respectively. The base-station signal driving unit 111-2, which receives the RF signal through the RF_2_SISO input port, outputs the received RF signal intact to the combine-divider 113. The base-station signal driving unit 111-3, which receives the RF signal through the RF_2_MIMO input port, modulates the RF signal to up or down convert a band thereof, and outputs a resulting signal to the combine-divider 113.

The combine-divider 113 mixes the four signals and outputs a mixture of the signals to the ODU 130. The ODU 130 converts the mixed signal into an optical RF signal and distributes the optical RF signal.

In the illustrated exemplary embodiment, the remote optical unit 150-1 may be configured as the exemplary embodiment of FIG. 9 and the remote optical unit 150-2 may be configured as the exemplary embodiment of FIG. 10. The operations of the remote optical units 150-1 and 150-2 in accordance with the exemplary embodiment of FIG. 18 will be described with reference to FIGS. 9 and 10.

Referring to FIG. 9, the remote optical unit 150-1 processes signals of two channels and has a suitable configuration capable of transmitting RF signals of two bands, i.e., the RF_1_SISO band and the RF_2_SISO band, which are output from the base-station signal driving units 111-1 and 111-2 of the BIU 110.

An upper channel of the remote optical unit 150-1 extracts an RF signal of a specified frequency band, i.e., the RF_1_SISO band, from a photoelectrically converted RF signal output from the photoelectric conversion unit (151) through the bandpass filter 153-1, amplifies the extracted RF signal, and outputs a resulting signal to the antenna. A lower channel of the remote optical unit 150-1 extracts an RF signal of a specified frequency band, i.e., the RF_2_SISO band, from the photoelectrically converted RF signal output from the photoelectric conversion unit (151) through the bandpass filter 153-2, amplifies the extracted RF signal, and outputs a resulting signal to the antenna. The RF signal of RF_1_SISO band and the RF signal of RF_2_SISO band are mixed in the forward direction by the combine unit 159 and then transmitted to the antenna. Descriptions of an uplink will be omitted.

Referring to FIG. 10, the remote optical unit 150-2 processes signals of two channels and has a suitable configuration capable of transmitting RF signals of two bands, i.e., the RF_1_MIMO band and the RF_2_MIMO band, which are output from the base-station signal driving units 111-3 and 111-4 of the BIU 110. More specifically, the remote optical unit 150-1 does not include a modulation/demodulation unit, whereas the remote optical unit 150-2 includes the modulation/demodulation unit 155-2, which converts the RF signal of the RF_1_MIMO band into an RF signal of the RF_1 band, and the modulation/demodulation unit 155-4, which converts the RF signal of the RF_2_MIMO band into an RF signal of the RF_2 band.

An upper channel of the remote optical unit 150-2 extracts an RF signal of another specified frequency band, i.e., the RF_1_MIMO band, from a photoelectrically converted RF signal output from the photoelectric conversion unit (151) through the bandpass filter 153-2, demodulates the extracted RF signal to a specified frequency band, i.e., the RF_1 band through band-down conversion by the modulation/demodulation unit 155-2, amplifies the demodulated RF signal in the amplifier 157-2, and outputs a resulting signal to the antenna. A lower channel of the remote optical unit 150-2 extracts an RF signal of another frequency band, i.e., the RF_2_MIMO band, from the photoelectrically converted RF signal through the bandpass filter 153-4, demodulates the extracted RF signal to a specified frequency band, i.e., the RF_2 band through band-down conversion by the modulation/demodulation unit 155-4, amplifies a demodulated RF signal in the amplifier 157-4, and outputs a resulting signal to the antenna. The RF signal of RF_1_MIMO band and the RF signal of RF_2_MIMO band are mixed in the forward direction by the combine unit 159 and then transmitted to the antenna. Descriptions of an uplink will be omitted.

As a result, the remote optical unit 150-1 transmits the data D1 through the RF signals of the RF_1 band and the data D2 through the RF signals of the RF_2 band, while the remote optical unit 150-2 transmits the data D1 through the RF signals of the RF_1 band and the data D3 through the RF signals of the RF_2 band. That is, since different data D1, D2, and D3 are transmitted using two frequency bands RF_1 and RF_2, it is the same as functions of three cells or a single cell sectorized into three sectors.

Figure 18:
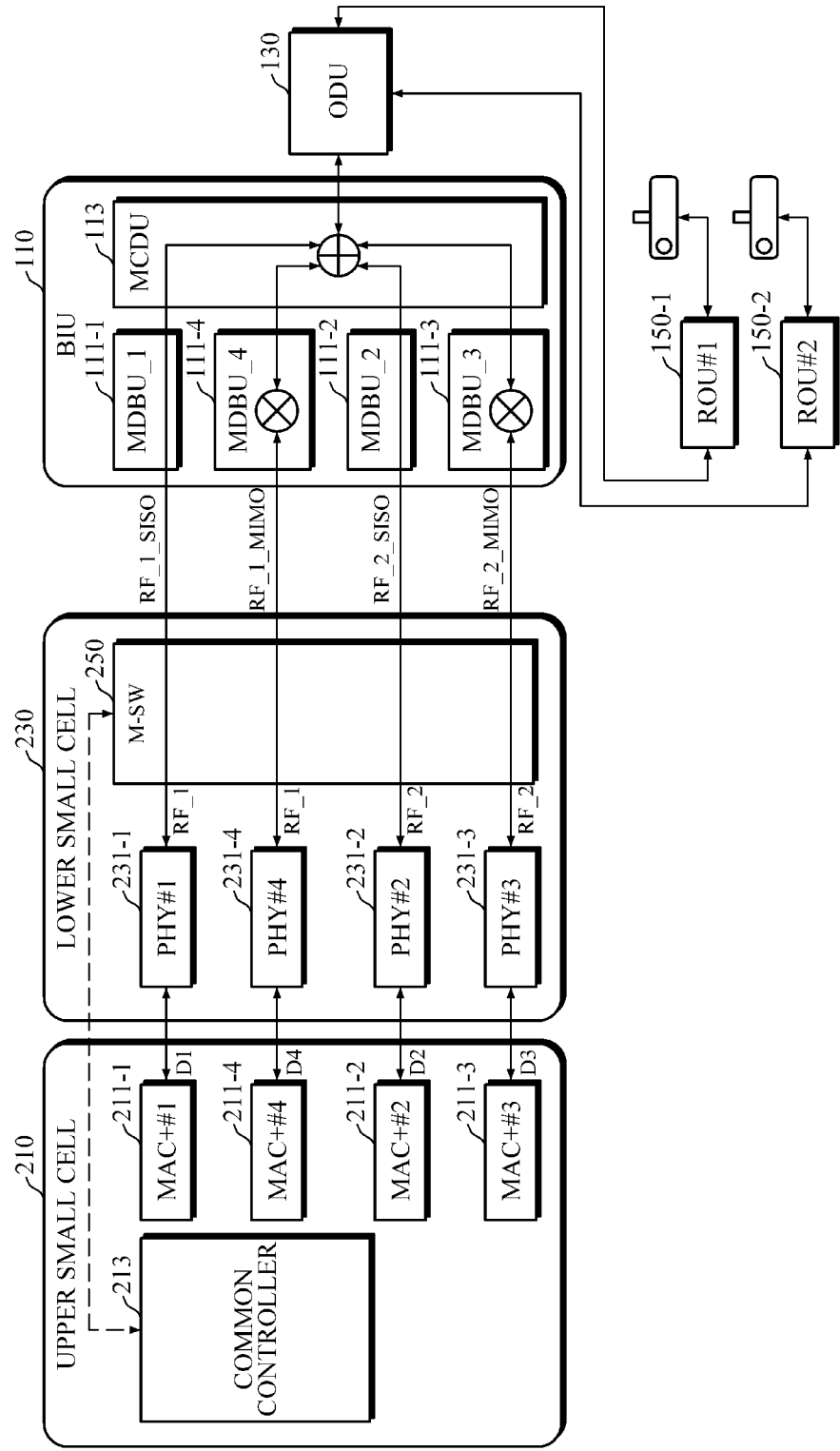
FIG. 18 is a diagram for describing a seventh operation mode of the cellular communication system in accordance with the exemplary embodiment illustrated in FIG. 3 or 5.

FIG. 18 is a diagram for describing a seventh operation mode of the cellular communication system in accordance with the exemplary embodiment illustrated in FIG. 3 or 5. When it is necessary to additionally increase the throughput in the sixth operation mode as illustrated in FIG. 17, the seventh operation mode may be initiated. In the seventh operation mode, the common controller 213 generates and executes another additional upper protocol processor 211-4 in the upper small cell unit 210, generates and executes another additional lower protocol processor 231-4 in the lower small cell unit 230, and connects the upper protocol processor 211-4 and the lower protocol processor 231-4. In the case where PHY#1, PHY#2, PHY#3, and PHY#4 are hardware circuits, the common controller 213 transmits only an output of the newly executed upper protocol processor 211-4 to PHY#4.

MAC±#1, MAC+#2, and MAC+#3, which are the existing upper protocol processors 211-1, 211-2, and 211-3, output data D1, data D2, and data D3, respectively, while MAC+#4, which is the newly executed upper protocol processor 211-4, outputs data D4. PHY#1, which is the existing lower protocol processor 231-1, and PHY#4, which is the newly executed lower protocol processor 231-4, both transmit signals of the RF_1 band, while the remaining existing lower protocol processors 231-2 and 231-3 output signals of the RF_2 band.

The first matching switch 250 disconnects the existing connection between the lower protocol processor 231-1, i.e., PHY#1 231-1, and the RF_1_MIMO input port of the BIU 110, and connects the newly executed lower protocol processor 231-4, i.e., PHY#4 231-4, with the RF_1_MIMO input port of the BIU 110. Connections of the remaining two input ports are maintained in the same state as the sixth operation mode.

The configurations of the BIU 110 and the remote optical units 150-1 and 150-2 are similar to those in the sixth operation mode. The common controller 213 has information about such a system configuration, and controls the first matching switch 250 according to the information so that interference among RF signals of the same frequency band can be avoided.

The four base-station signal driving units 111-1, 111-2, 111-3, and 111-4 of the BIU 110 receive an RF_1_SISO RF signal, an RF_2_SISO RF signal, an RF_2_MIMO RF signal, and an RF_1_MIMO RF signal, respectively. The base-station signal driving unit 111-1, which receives the RF signal through the RF_1_SISO input port, outputs the RF signal intact to the combine-divider 113. The base-station signal driving unit 111-2, which receives the RF signal through the RF_2_SISO input port, outputs the RF signal intact to the combine-divider 113. The base-station signal driving unit 111-3, which receives the RF signal through the RF_2_MIMO input port, modulates the received RF signal to up or down convert a band thereof and outputs a resulting signal to the combine-divider 113. The base-station signal driving unit 111-4, which receives the RF signal through the RF_1_MIMO input port, modulates the RF signal to up or down convert a band thereof and outputs a resulting signal to the combine-divider 113.

The combine-divider 113 mixes the four signals and outputs a mixture of the signals to the ODU 130. The ODU 130 converts the mixed signal into an optical RF signal and distributes the optical RF signal.

In the illustrated exemplary embodiment, the remote optical unit 150-1 may be configured as the exemplary embodiment of FIG. 9 and the remote optical unit 150-2 may be configured as the exemplary embodiment of FIG. 10. The operations of the remote optical units 150-1 and 150-2 in accordance with the exemplary embodiment of FIG. 18 will be described with reference to FIGS. 9 and 10.

Referring to FIG. 9, the remote optical unit 150-1 processes signals of two channels and has a suitable configuration capable of transmitting RF signals of two bands, i.e., the RF_1_SISO band and the RF_2_SISO band, which are output from the base-station signal driving units 111-1 and 111-2 of the BIU 110.

An upper channel of the remote optical unit 150-1 extracts an RF signal of a specified frequency band, i.e., the RF_1_SISO band, from a photoelectrically converted RF signal output from the photoelectric conversion unit (151) through the bandpass filter 153-1, amplifies the extracted RF signal, and outputs a resulting signal to the antenna. A lower channel of the remote optical unit 150-1 extracts an RF signal of a specified frequency band, i.e., the RF_2_SISO band, from the photoelectrically converted RF signal output from the photoelectric conversion unit (151) through the bandpass filter 153-2, amplifies the extracted RF signal, and outputs a resulting signal to the antenna. The RF signal of the RF_1_SISO band and the RF signal of the RF_2_SISO band are mixed in the forward direction by the combine unit 159 and then transmitted to the antenna. Descriptions of an uplink will be omitted.

Referring to FIG. 10, the remote optical unit 150-2 processes signals of two channels and has a suitable configuration capable of transmitting RF signals of two bands, i.e., the RF_1_MIMO band and the RF_2_MIMO band, which are output from the base-station signal driving units 111-3 and 111-4 of the BIU 110. More specifically, the remote optical unit 150-1 does not include a modulation/demodulation unit, whereas the remote optical unit 150-2 includes the modulation/demodulation unit 155-2, which converts the RF signal of the RF_1_MIMO band into an RF signal of the RF_1 band, and the modulation/demodulation unit 155-4, which converts the RF signal of the RF_2_MIMO band into an RF signal of the RF_2 band.

An upper channel of the remote optical unit 150-2 extracts an RF signal of another specified frequency band, i.e., the RF_1_MIMO band, from a photoelectrically converted RF signal output from the photoelectric conversion unit (151) through the bandpass filter 153-2, demodulates the extracted RF signal to a specified frequency band, i.e., the RF_1 band through band-down conversion by the modulation/demodulation unit 155-2, amplifies the demodulated RF signal in the amplifier 157-2, and outputs a resulting signal to the antenna. A lower channel of the remote optical unit 150-2 extracts an RF signal of another frequency band, i.e., the RF_2_MIMO band, from the photoelectrically converted RF signal through the bandpass filter 153-4, demodulates the extracted RF signal to a specified frequency band, i.e., the RF_2 band through band-down conversion by the modulation/demodulation unit 155-4, amplifies the demodulated RF signal in the amplifier 157-4, and outputs a resulting signal to the antenna. The RF signal of RF_1_MIMO band and the RF signal of RF_2_MIMO band are mixed in the forward direction by the combine unit 159 and then transmitted to the antenna. Descriptions of an uplink will be omitted.

As a result, the remote optical unit 150-1 transmits the data D1 through the RF signals of the RF_1 band and the data D2 through the RF signals of the RF_2 band, while the remote optical unit 150-2 transmits the data D4 through the RF signals of the RF_1 band and the data D3 through the RF signals of the RF_2 band. That is, since different data D1, D2, D3, and D4 are sent out using two frequency bands RF_1 and RF_2, it is the same as functions of four cells or a single cell sectorized into four sectors.

That is, a band of the RF signal output from the first matching switch 250 of the lower small cell unit 230 matches a frequency of the bandpass filter of the RDU in the matched remote optical unit. In addition, in a case in which the band of the RF signal is converted in the base-station signal driving unit 111 of the BIU 110, the band matches the frequency of the bandpass filter of the RDU inside the matched remote optical unit.

By generalizing the aspects of the proposed invention, it is possible to flexibly increase throughput when service capacity is additionally required. In other words, by varying a passband of the bandpass filter in each remote unit, the common controller additionally activates and allocates another physical layer, or controls the base-station signal driving unit to up or down convert a band of the signal to a band of the bandpass filter of a remote unit to be connected thereto in order to increase throughput for a physical layer that uses the same frequency band, and thereby an increase in throughput is generally achieved.

According to the proposed invention, it is possible to provide an expanded cellular communication using an existing analog DAS.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cellular communication system comprising:
a small cell signal source comprising:
an upper small cell unit comprising a plurality of upper protocol processors configured to process an upper first part of a protocol stack of a small cell,
a lower small cell unit comprising a plurality of lower protocol processors configured to process a remaining second part of the protocol stack of the small cell,
wireless converters configured to convert a digital signal received from the respective lower protocol processors into a radio frequency (RF) signal,
a first matching switch configured to switch on or off an output path of each of the lower protocol processors, and
a common controller configured to control activation of the plurality of upper protocol processors of the upper small cell unit and the plurality of lower protocol processors of the lower small cell unit according to a required service capacity and configured to control an operation of the first matching switch;
a headend unit configured to interface with the small cell signal source and process bidirectional distribution of an analog RF signal and comprising a base station interface unit (BIU) including base-station signal driving units configured to:
receive signals of each band from the plurality of lower protocol processors,
up or down convert bands of the received signals, and output resultant signals to a combine-divider configured to mix RF signals input from the plurality of base-station signal driving units and output the mixed RF signals; and
a plurality of remote units configured to wirelessly transmit analog RF signals, which have been distributed from the headend unit, through an antenna and configured to transmit uplink RF signals from wireless terminals to the headend unit,
wherein each remote unit comprises a bandpass filter configured to filter a designated band of the RF signal received from the headend unit and a modulation unit and a demodulation unit configured to up or down convert a band of the filtered RF signal and output a converted signal.

2. The cellular communication system of claim 1, wherein the plurality of upper protocol processors process a media access control (MAC) layer or higher in the protocol stack of the small cell and the plurality of lower protocol processors process a physical (PHY) layer of the protocol stack of the small cell.

3. The cellular communication system of claim 1, wherein the plurality of upper protocol processors of the upper small cell unit are implemented as software tasks whose executions are controlled by the common controller.

4. The cellular communication system of claim 1, wherein the plurality of lower protocol processors of the lower small cell unit are implemented as software tasks whose executions are controlled by the common controller.

5. The cellular communication system of claim 1, wherein the common controller is implemented by a part included in the upper small cell unit.

6. The cellular communication system of claim 1, wherein the common controller additionally activates the plurality of upper protocol processors when an increase in the number of users is required.

7. The cellular communication system of claim 1, wherein the common controller additionally activates the plurality of lower protocol processors when an increase in bandwidth is required, and accordingly, the common controller controls the operation of the first matching switch.

8. The cellular communication system of claim 1, wherein the wireless converters are disposed between the plurality of lower protocol processors and input ports of the first matching switch and are configured to convert an output of the plurality of lower protocol processors into the radio frequency (RF) signal.

9. The cellular communication system of claim 8, wherein the common controller is configured to control the wireless converters having the same service process for modulating different frequencies.

10. The cellular communication system of claim 1, wherein the wireless converters are respectively connected to respective output ports of the first matching switch and are configured to convert an output of the respective lower protocol processors into the RF signal.

11. The cellular communication system of claim 10, wherein the common controller is configured to control the wireless converters having the same service process for modulating different frequencies.

12. The cellular communication system of claim 1, wherein the first matching switch is connected between outputs of the plurality of lower protocol processors and a plurality of inputs of a headend unit of an analog distributed antenna system.

13. The cellular communication system of claim 12, wherein, when an increase in bandwidth is required, the common controller controls the operation of the first matching switch and controls whether a lower protocol processor performs modulation.

14. The cellular communication system of claim 13, wherein, when additional service capacity is required, the common controller additionally activates an upper protocol processor and a lower protocol processor corresponding to the upper protocol processor, and
wherein the lower protocol processor transceiving an RF signal is activated in a band that is different from a current band, and the common controller controls the additionally activated lower protocol processor to be connected to a base-station signal driving unit.

15. The cellular communication system of claim 13, wherein, when additional service capacity is required, the common controller additionally activates an upper protocol processor and a lower protocol processor, controls a base-station signal driving unit connected to the additionally activated lower protocol processor to perform band up/down-conversion, and controls a remote unit corresponding to the base-station signal driving unit to perform reverse band conversion.

16. The cellular communication system of claim 1, wherein the first matching switch is connected between outputs of the plurality of upper protocol processors and inputs of the plurality of lower protocol processors.

17. The cellular communication system of claim 16, wherein, when an increase in bandwidth is required, the common controller controls and combines operations of the first matching switch and the plurality of lower protocol processors.

18. The cellular communication system of claim 17, wherein, when an additional service capacity is required, the common controller additionally activates a lower protocol processor transceiving an RF signal in a band that is different from a current band.

19. The cellular communication system of claim 17, wherein, when additional service capacity is required, the common controller additionally activates a lower protocol processor, controls a base-station signal driving unit connected to the additionally activated lower protocol processor to perform band up/down-conversion, and controls a remote unit corresponding to the base-station signal driving unit to perform reverse band conversion.

20. The cellular communication system of claim 1, further comprising a second matching switch configured to switch on or off connections between each of the plurality of lower protocol processors of the lower small cell unit and each of the plurality of upper protocol processors of the upper small cell unit,
wherein the common controller is configured to control the operation of the second matching switch in addition to the operation of the first matching switch.

21. The cellular communication system of claim 20, wherein, when an increase in the number of users is required, the common controller additionally activates an upper protocol processor and controls the operation of the second matching switch.

22. A cellular communication system comprising:
a small cell signal source comprising:
an upper small cell unit comprising a plurality of upper protocol processors configured to process an upper first part of a protocol stack of a small cell,
a lower small cell unit comprising a plurality of lower protocol processors configured to process a remaining second part of the protocol stack of the small cell,
a second matching switch disposed between the plurality of upper protocol processors and the plurality of lower protocol processors, and configured to switch on or off connections between each of the plurality of lower protocol processors of the lower small cell unit and each of the plurality of upper protocol processors of the upper small cell unit, and
a common controller configured to control activation of the plurality of upper protocol processors of the upper small cell unit and the plurality of lower protocol processors of the lower small cell unit according to a required service capacity and configured to control an operation of the second matching switch;
a headend unit configured to interface with the small cell signal source and process bidirectional distribution of an analog RF signal and comprising a base station interface unit (BIU) including base-station signal driving units configured to:
receive signals of each band from the plurality of lower protocol processors,
up or down convert bands of the received signals, and
output resultant signals to a combine-divider configured to mix RF signals input from the plurality of base-station signal driving units and output the mixed RF signals; and
a plurality of remote units configured to wirelessly transmit analog RF signals, which have been distributed from the headend unit, through an antenna and configured to transmit uplink RF signals from wireless terminals to the headend unit,
wherein each remote unit comprises a bandpass filter configured to filter a designated band of an RF signal received from the headend unit and a modulation unit and a demodulation unit configured to up or down convert a band of the filtered RF signal and output a converted signal.

* * * * *